US008826713B2

(12) United States Patent
Akimoto et al.

(10) Patent No.: US 8,826,713 B2
(45) Date of Patent: Sep. 9, 2014

(54) METHOD AND APPARATUS FOR MANUFACTURING STATOR COIL FOR ELECTRIC ROTATING MACHINE

(75) Inventors: Akito Akimoto, Kariya (JP); Takuji Harada, Hekinan (JP); Seiji Yamaguchi, Chiryu (JP); Atsuo Ishizuka, Nagoya (JP)

(73) Assignee: Denso Corporation, Kariya (JP)

( * ) Notice: Subject to any disclaimer, the term of this patent is extended or adjusted under 35 U.S.C. 154(b) by 760 days.

(21) Appl. No.: 13/006,678

(22) Filed: Jan. 14, 2011

(65) Prior Publication Data

US 2011/0174037 A1 Jul. 21, 2011

(30) Foreign Application Priority Data

Jan. 15, 2010 (JP) ................................ 2010-007183

(51) Int. Cl.
*B21B 3/00* (2006.01)
*B21F 3/04* (2006.01)
*H02K 15/04* (2006.01)
*H02K 3/28* (2006.01)

(52) U.S. Cl.
CPC .............. *H02K 3/28* (2013.01); *H02K 15/0478* (2013.01)
USPC .................. 72/127; 72/133; 72/135; 72/142; 72/371; 140/92.2

(58) Field of Classification Search
USPC ........... 72/127, 133, 135, 137, 142, 306, 307, 72/371; 140/92.2, 102; 29/596, 605, 606
See application file for complete search history.

(56) References Cited

U.S. PATENT DOCUMENTS 7,185,414 B2 * 3/2007 Sadiku ............................ 29/598
8,008,830 B2 8/2011 Kouda et al.
8,096,046 B2 * 1/2012 Shives et al. ................... 29/732

(Continued)

FOREIGN PATENT DOCUMENTS

JP H08-163838 6/1996
JP 2004-173357 6/2004

(Continued)

OTHER PUBLICATIONS

Office Action (1 page) dated Aug. 20, 2013, issued in corresponding Japanese Application No. 2010-007183 and English translation (1 page).

(Continued)

*Primary Examiner* — Edward Tolan
(74) *Attorney, Agent, or Firm* — Nixon & Vanderhye, P.C.

(57) ABSTRACT

A method of manufacturing a stator coil for an electric rotating machine includes the steps of: (1) forming substantially planar electric wires each of which includes in-slot portions to be received in slots of a stator core and turn portions to be located outside the slots to connect adjacent pairs of the in-slot portions; (2) rolling each of the planar electric wires through plastic deformation into a spiral or circular-arc shape; and (3) assembling the rolled electric wires together to form the stator coil. Further, in the rolling step, each of the planar electric wires is rolled by deforming each of the turn portions of the electric wire while restricting movement of at least one of the in-slot portions of the electric wire which is located closer to a rolling start end of the electric wire than the turn portion is.

12 Claims, 31 Drawing Sheets

(56) References Cited

U.S. PATENT DOCUMENTS

| | | | | |
|---|---|---|---|---|
| 8,136,221 | B2 | 3/2012 | Takada et al. | |
| 8,253,296 | B2 | 8/2012 | Kouda et al. | |
| 8,371,020 | B2 * | 2/2013 | Gorohata et al. | 29/606 |
| 8,397,368 | B2 * | 3/2013 | Akimoto et al. | 29/596 |
| 8,413,314 | B2 * | 4/2013 | Nakamura | 29/596 |
| 2009/0001841 | A1 | 1/2009 | Naganawa et al. | |
| 2009/0260219 | A1 | 10/2009 | Takada et al. | |
| 2010/0141078 | A1 | 6/2010 | Kouda et al. | |
| 2012/0007462 | A1 | 1/2012 | Kouda et al. | |

FOREIGN PATENT DOCUMENTS

| | | | |
|---|---|---|---|
| JP | 3894004 | 12/2006 | |
| JP | 2009-011116 | 1/2009 | |
| JP | 2009-112186 | 5/2009 | |
| JP | 2009-213199 | 9/2009 | |
| JP | 2009-247199 | 10/2009 | |
| JP | 2009-268157 A * | 11/2009 | H02K 15/085 |
| JP | 2009-268221 | 11/2009 | |
| JP | 2009-284754 | 12/2009 | |

OTHER PUBLICATIONS

Office Action (1 page) dated Jan. 7, 2014, issued in corresponding Japanese Application No. 2010-007183 and English translation (2 pages).

* cited by examiner

FIG. 17

| SLOT NUMBER | OUTERMOST LAYER | INNERMOST LAYER |
|---|---|---|
| 1 | U1-1 | U1-3' |
| 2 | U2-1 | U2-3' |
| 3 | W1-1' | W1-3 |
| 4 | W2-1' | W2-3 |
| 5 | V1-1 | V1-3' |
| 6 | V2-1 | V2-3' |
| 7 | U1-1' | U1-4 |
| 8 | U2-1' | U2-4 |
| 9 | W1-1 | W1-4' |
| 10 | W2-1 | W2-4' |
| 11 | V1-1' | V1-4 |
| 12 | V2-1' | V2-4 |
| 13 | U1-2' | U1-4' |
| 14 | U2-2 | U2-4' |
| 15 | W1-2' | W1-4 |
| 16 | W2-2' | W2-4 |
| 17 | V1-2 | V1-4' |
| 18 | V2-2 | V2-4' |
| 19 | U1-2' | U1-1 |
| 20 | U2-2' | U2-1 |
| 21 | W1-2 | W1-1' |
| 22 | W2-2 | W2-1' |
| 23 | V1-2' | V1-1 |
| 24 | V2-2' | V2-1 |

| SLOT NUMBER | OUTERMOST LAYER | INNERMOST LAYER |
|---|---|---|
| 25 | U1-3 | U1-1' |
| 26 | U2-3 | U2-1' |
| 27 | W1-3' | W1-1 |
| 28 | W2-3' | W2-1 |
| 29 | V1-3 | V1-1' |
| 30 | V2-3 | V2-1' |
| 31 | U1-3' | U1-2 |
| 32 | U2-3' | U2-2 |
| 33 | W1-3 | W1-2' |
| 34 | W2-3 | W2-2' |
| 35 | V1-3' | V1-2 |
| 36 | V2-3' | V2-2 |
| 37 | U1-4 | U1-2' |
| 38 | U2-4 | U2-2' |
| 39 | W1-4' | W1-2 |
| 40 | W2-4' | W2-2 |
| 41 | V1-4 | V1-2' |
| 42 | V2-4 | V2-2' |
| 43 | U1-4' | U1-3 |
| 44 | U2-4' | U2-3 |
| 45 | W1-4 | W1-3' |
| 46 | W2-4 | W2-3' |
| 47 | V1-4' | V1-3 |
| 48 | V2-4' | V2-3 |

METHOD AND APPARATUS FOR MANUFACTURING STATOR COIL FOR ELECTRIC ROTATING MACHINE

CROSS-REFERENCE TO RELATED APPLICATION

This application is based on and claims priority from Japanese Patent Application No. 2010-7183, filed on Jan. 15, 2010, the content of which is hereby incorporated by reference in its entirety into this application.

BACKGROUND OF THE INVENTION

1. Technical Field of the Invention

The present invention relates to methods and apparatuses for manufacturing stator coils for electric rotating machines that are used in, for example, motor vehicles as electric motors and electric generators.

2. Description of the Related Art

Conventionally, there are known stators for electric rotating machines which include a hollow cylindrical stator core and a stator coil.

The stator core has a plurality of slots that are formed in the radially inner surface of the stator core and spaced in the circumferential direction of the stator core. The stator coil is comprised of a plurality of electric wires mounted on the stator core. Each of the electric wires includes a plurality of in-slot portions, each of which is received in a corresponding one of the slots of the stator core, and a plurality of turn portions each of which connects an adjacent pair of the in-slot portions and is located outside the slots of the stator core.

Moreover, as disclosed, for example, in Japanese Patent Application Publication No. 2009-247199, the stator coil may be formed by: (1) assembling the electric wires to form a planar electric wire assembly; and (2) rolling the planar electric wire assembly by a predetermined number of turns into a hollow cylindrical shape.

For the thus-formed stator coil, it is necessary for corresponding in-slot portions of the electric wires which are to be received in the same slot of the stator core to be aligned in a radial direction of the stator coil. However, due to springback of the electric wires, it may be easy for misalignment between the corresponding in-slot portions of the electric wires to occur during the rolling step.

The misalignment may make it difficult to accurately assemble the stator coil with the stator core. Further, the misalignment may also decrease the space factor of the corresponding in-slot portions of the electric wires in the slot of the stator core and deteriorate the magnetic characteristics of the stator.

Specifically, as shown in FIG. 33, the corresponding in-slot portions of the electric wires may be deviated from each other in the circumferential direction of the stator coil (or in the circumferential direction of the stator core), resulting in the misalignment between the corresponding in-slot portions in the radial direction of the stator coil (or in the radial direction of the stator core).

Moreover, as shown in FIG. 34, the corresponding in-slot portions of the electric wires may be twisted to become non-parallel to each other. In this case, a corner portion of one of the corresponding in-slot portions may come into contact with a radial end face of another one of the same, thereby damaging an insulating coat formed at the radial end face.

SUMMARY OF THE INVENTION

According to one aspect of the present invention, there is provided a method of manufacturing a stator coil for a stator of an electric rotating machine. The stator includes a hollow cylindrical stator core having a plurality of slots that are formed in the radially inner surface of the stator core and spaced in the circumferential direction of the stator core. The method includes the steps of: (1) forming a plurality of substantially planar electric wires, each of the planar electric wires including a plurality of in-slot portions and a plurality of turn portions, each of the in-slot portions being to be received in a corresponding one of the slots of the stator core, each of the turn portions connecting an adjacent pair of the in-slot portions and being to be located outside the slots of the stator core; (2) rolling each of the planar electric wires through plastic deformation into a spiral or circular-arc shape; and (3) assembling the rolled electric wires together to form the stator coil. Further, in the rolling step, each of the planar electric wires is rolled by deforming each of the turn portions of the electric wire while restricting movement of at least one of the in-slot portions of the electric wire which is located closer to a rolling start end of the electric wire than the turn portion is.

According to another aspect of the present invention, there is provided an apparatus for rolling a substantially planar electric wire, which is for use in forming a stator coil of a stator of an electric rotating machine, into a spiral or circular-arc shape. The stator includes a hollow cylindrical stator core having a plurality of slots that are formed in the radially inner surface of the stator core and spaced in the circumferential direction of the stator core. The planar electric wire includes a plurality of in-slot portions, each of which is to be received in a corresponding one of the slots of the stator core, and a plurality of turn portions each of which connects an adjacent pair of the in-slot portions and is to be located outside the slots of the stator core. The apparatus includes a plurality of deforming portions and a plurality of restricting portions. The deforming portions sequentially deform the turn portions of the planar electric wire from a rolling start end of the electric wire, thereby rolling the planar electric wire into the spiral or circular-arc shape. Each of the restricting portions restricts movement of a corresponding one of the in-slot portions of the planar electric wire during the deformation of the turn portions which are located further from the rolling start end of the electric wire than the corresponding in-slot portion is.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings:

FIG. 17 is a tabular representation showing the correspondence between slot number and the labels of radially innermost and outermost electric wires for each slot of the stator core;

DESCRIPTION OF PREFERRED EMBODIMENT

Figure 1:
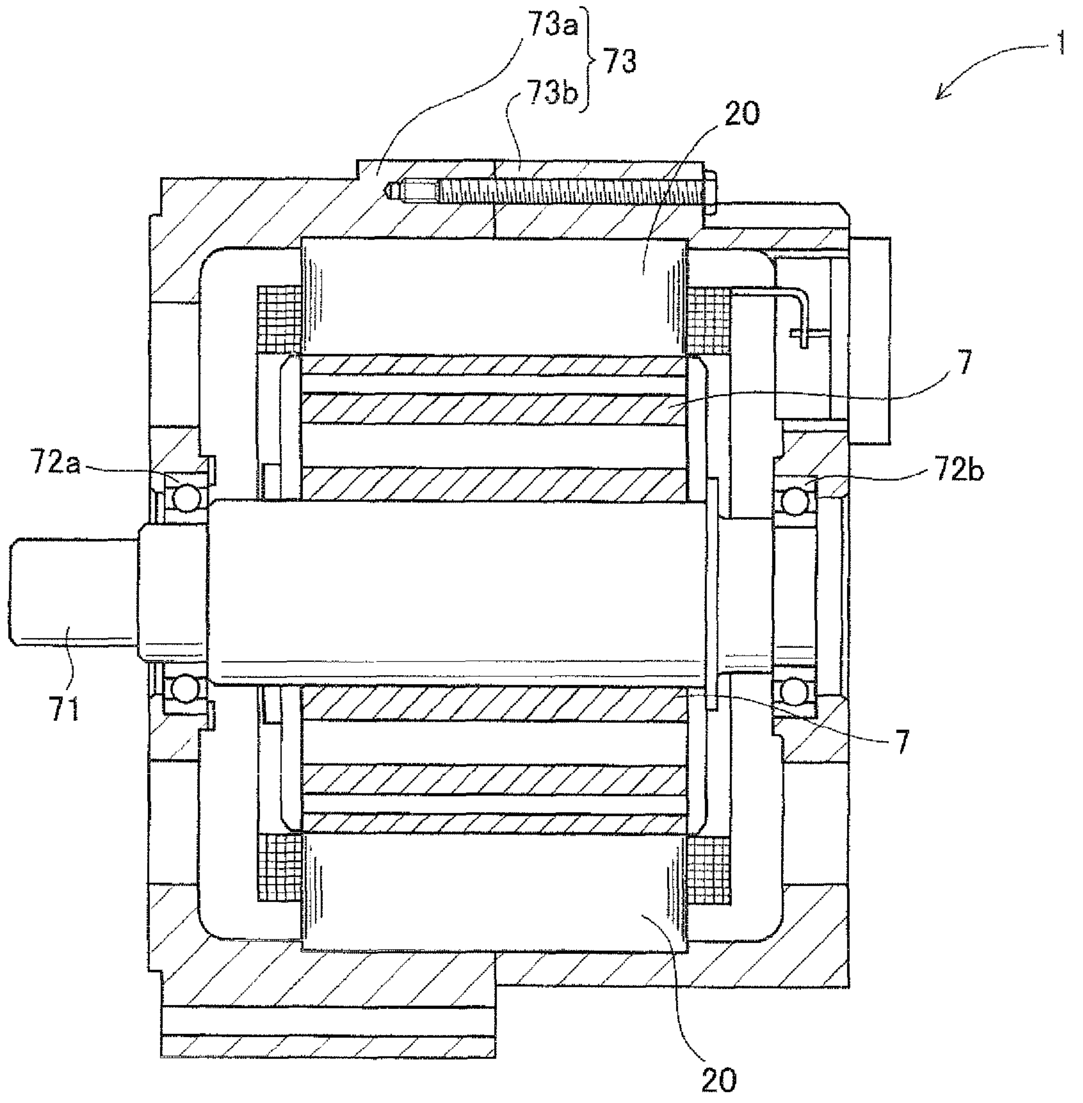
FIG. 1 is a schematic cross-sectional view illustrating the overall configuration of an electric rotating machine which includes a stator according to an embodiment of the invention.

FIG. 1 shows the overall configuration of an electric rotating machine 1 which includes a stator coil manufactured by a method according to an embodiment of the invention.

The electric rotating machine 1 is configured to function both as an electric motor and as an electric generator in a motor vehicle.

As shown in FIG. 1, the electric rotating machine 1 includes a rotor 7, a stator 20, and a housing 73. The housing 73 is composed of a pair of cup-shaped housing pieces 73*a* and 73*b* which are jointed together at the open ends thereof. The housing 73 has a pair of bearings 72*a* and 72*b* mounted therein, via which a rotating shaft 71 is rotatably supported by the housing 73. The rotor 7 is received in the housing 73 and fixed on the rotating shaft 71. The stator 20 is fixed in the housing 73 so as to surround the radially outer periphery of the rotor 7.

The rotor 7 includes a plurality of permanent magnets that form a plurality of magnetic poles on the radially outer periphery of the rotor 7 to face the radially inner periphery of the stator 20. The polarities of the magnetic poles alternate between north and south in the circumferential direction of the rotor 7. In addition, in the present embodiment, the number of the magnetic poles formed in the rotor 7 is equal to eight (i.e., four north poles and four south poles).

Figure 2:
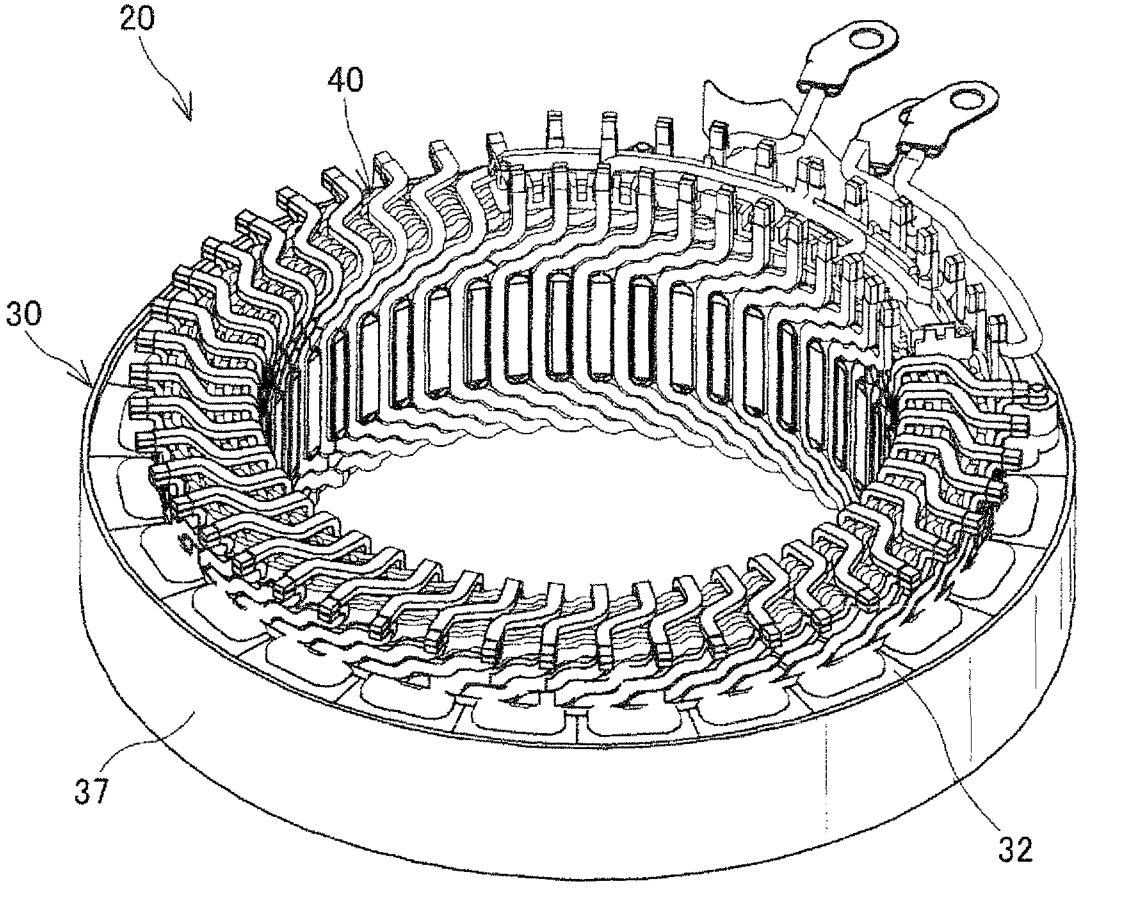
FIG. 2 is a perspective view of the stator according to the embodiment.
Figure 3:
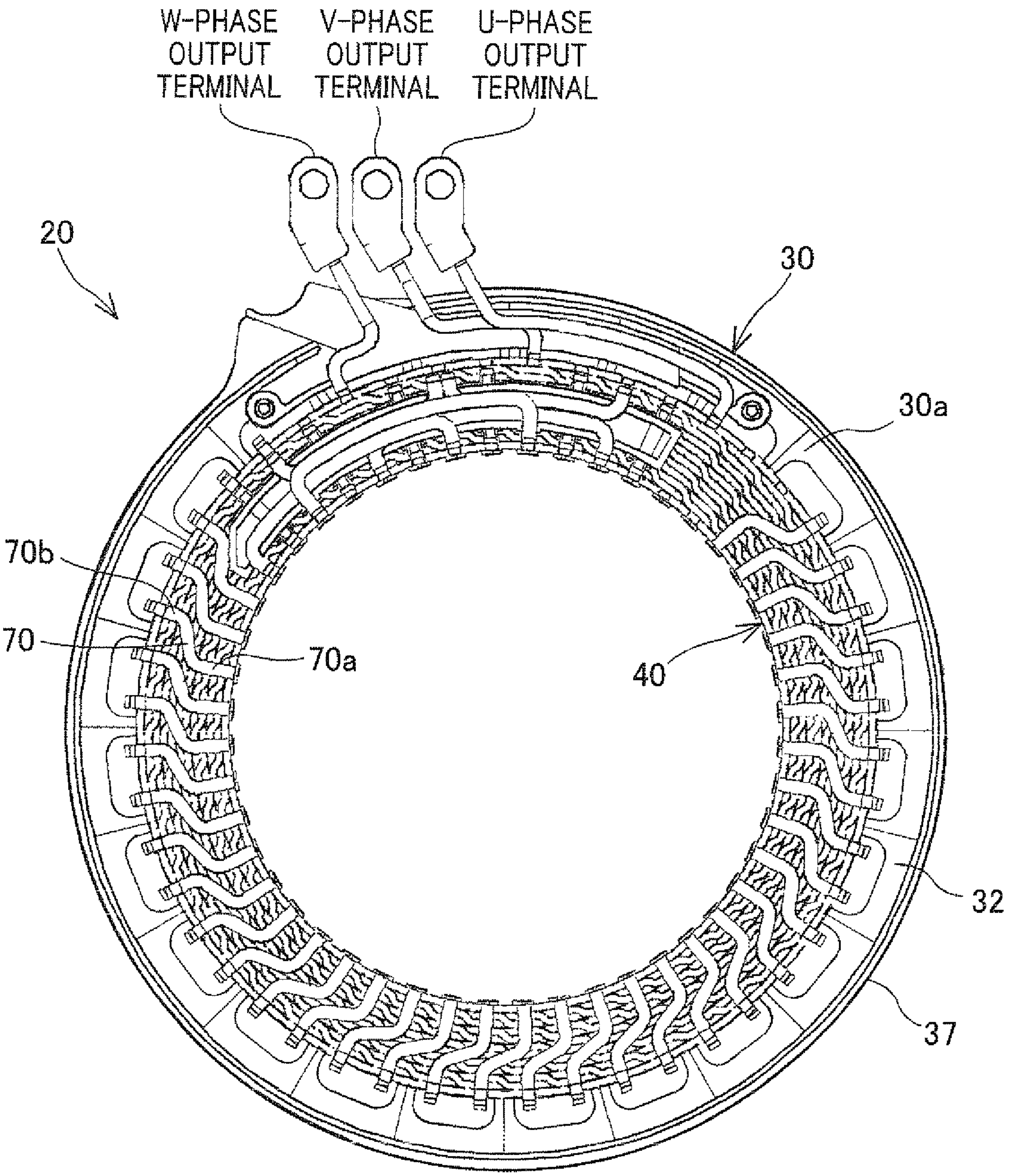
FIG. 3 is a top view of the stator.
Figure 4:
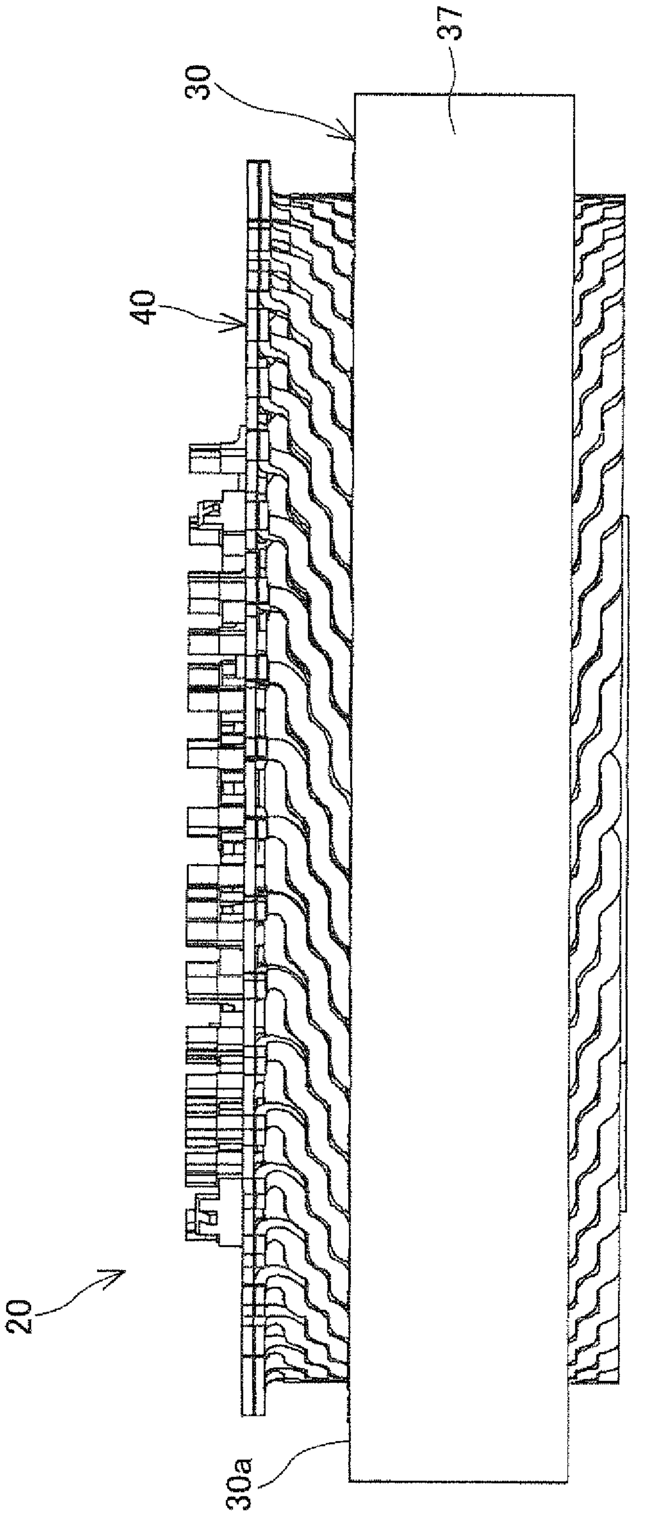
FIG. 4 is a side view of the stator.

Referring now to FIGS. 2-4, the stator 20 includes a hollow cylindrical stator core 30 and a three-phase stator coil 40 that is comprised of a plurality of (e.g., 48 in the present embodiment) electric wires 50 mounted on the stator core 30. In addition, the stator 20 may further include insulating paper interposed between the stator core 30 and the stator coil 40.

Figure 5:
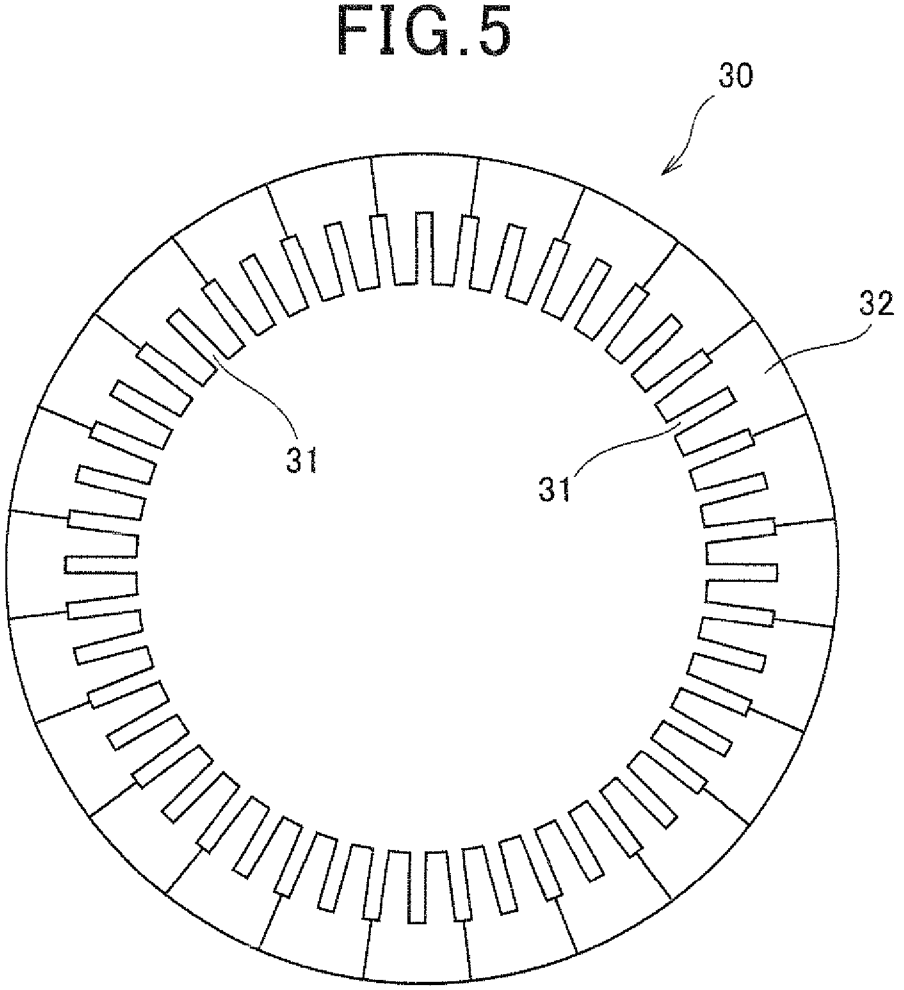
FIG. 5 is a top view of a stator core of the stator.

The stator core 30 has, as shown in FIG. 5, a plurality of slots 31 that are formed in the radially inner surface of the stator core 30 and spaced in the circumferential direction of the stator core 30 at a predetermined pitch. For each of the slots 31, the depth-wise direction of the slot 31 is coincident with a radial direction of the stator core 30. In the present embodiment, there are provided two slots 31 per magnetic pole of the rotor 7 that has the eight magnetic poles and per phase of the three-phase stator coil 40. Accordingly, the total number of the slots 31 provided in the stator core 30 is equal to 48 (i.e., 2×8×3).

Figure 6:
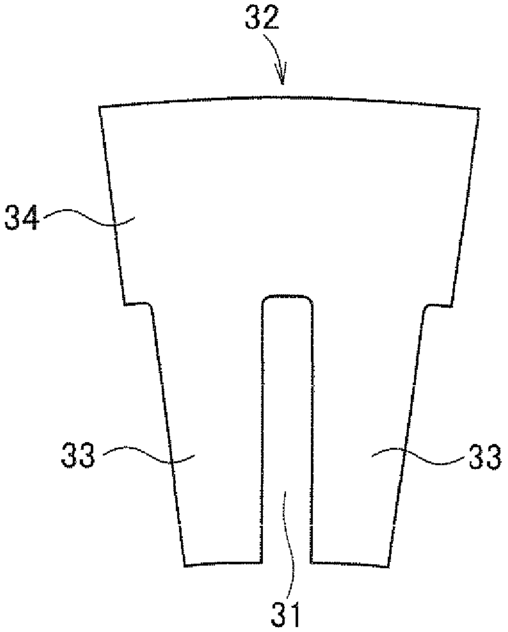
FIG. 6 is a top view of one of stator core segments which together make up the stator core.

Moreover, in the present embodiment, the stator core 30 is composed up of, for example, 24 stator core segments 32 as shown in FIG. 6. The stator core segments 32 are joined together so as to adjoin one another in the circumferential direction of the stator core 30. Each of the stator core segments 32 defines therein one of the slots 31. Further, each circumferentially-adjoining pair of the stator core segments 32 together defines a further one of the slots 31 therebetween. Each of the stator core segments 32 also has two tooth portions 33, which radially extend to form the one of the slots 31 therebetween, and a back core portion 34 that is located radially outward of the tooth portions 33 to connect them. In addition, on the radially outer surfaces of the stator core segments 32, there is fitted a cylindrical outer rim 37 (see FIGS. 2-4).

In the present embodiment, each of the stator core segments 32 is formed by laminating a plurality of magnetic steel sheets with insulating films interposed therebetween. It should be noted that other conventional metal sheets may also be used instead of the magnetic steel sheets.

FIGS. 7-10 together show the configuration of the stator coil 40, which is formed with the electric wires 50 into a hollow cylindrical shape.

As shown in FIGS. 7-10, the stator coil 40 has, as a whole, a straight part 41 to be received in the slots 31 of the stator core 30, and a pair of coil end parts 42 that are respectively formed on opposite axial sides of the straight part 41 and to be located outside the slots 31. Moreover, on one axial side of the straight part 41, U-phase, V-phase, and W-phase output terminals and U-phase, V-phase, and W-phase neutral terminals of the stator coil 40 protrude from the annular axial end face of the coil end part 42, and a plurality of crossover parts 70 of the electric wires 50 cross over the axial end face from the radially inner side to the radially outer side of the axial end face to connect corresponding pairs of the electric wires 50.

Figure 11A:
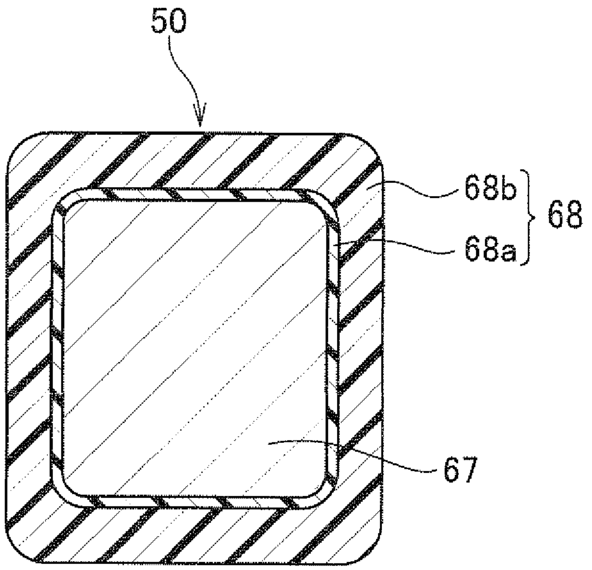
FIG. 11A is a cross-sectional view illustrating the configuration of electric wires forming the stator coil.

Each of the electric wires 50 for forming the stator coil 40 is configured with, as shown in FIG. 11A, an electric conductor 67 and an insulating coat 68 that covers the outer surface of the electric conductor 67. In the present embodiment, the electric conductor 67 is made of copper and has a substantially rectangular cross section. The insulating coat 68 is two-layer structured to include an inner layer 68*a* and an outer layer 68*b*. The thickness of the insulating coat 68 (i.e., the sum of thicknesses of the inner and outer layers 68*a* and 68*b*) is set to be in the range of 100 to 200 μm.

With such a large thickness of the two-layer structured insulating coat 68, it is possible to reliably insulate the electric wires 50 from one another without interposing insulating paper therebetween. However, it is also possible to interpose insulating paper between the electric wires 50 so as to further enhance the electrical insulation therebetween.

Further, the outer layer 68*b* is made of an insulating material such as nylon. The inner layer 68*a* is made of a thermoplastic resin having a higher glass transition temperature than the outer layer 68*b* or an insulating material having no glass transition temperature such as a polyamide-imide resin. Consequently, the outer layers 68*b* of the electric wires 50 will be solidified by the heat generated by operation of the electric rotating machine 1 earlier than the inner layers 68*a*. As a result, the surface hardness of the outer layers 68*b* will be increased, thereby enhancing the electrical insulation between the electric wires 50.

Figure 11B:
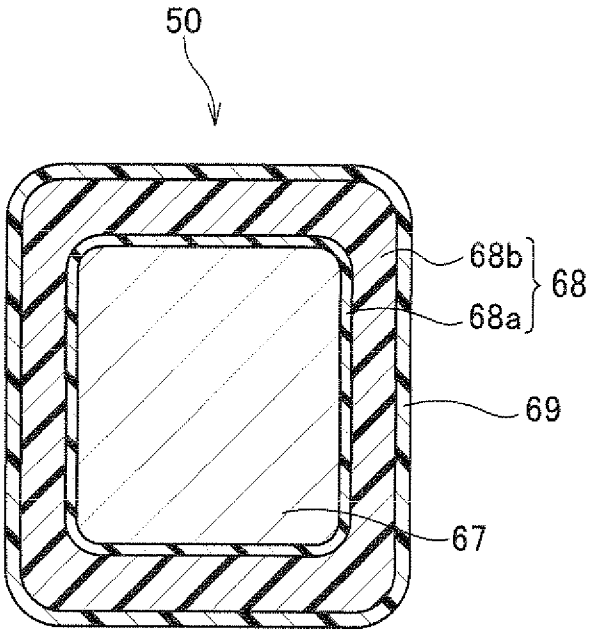
FIG. 11B is a cross-sectional view illustrating a modification of the configuration of the electric wires shown in FIG. 10A.

Furthermore, as shown in FIG. 11B, it is also possible for each of the electric wires 50 to further include a fusible coat 69 to cover the outer surface of the insulating coat 68; the fusible coat 69 may be made, for example, of epoxy resin. In this case, the fusible coats 69 of the electric wires 50 will be fused by the heat generated by operation of the electric rotating machine 1 earlier than the insulating coats 68, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, the outer layers 68*b* of the insulating coats 68 of the electric wires 50 may also be made of PPS (polyphenylene sulfide).

Figure 12A:
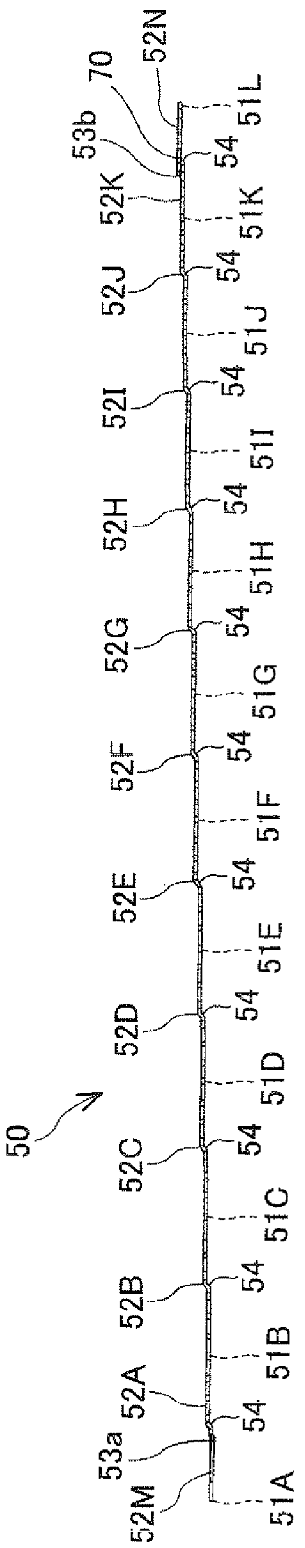
FIG. 12A is a top view of one of the electric wires.
Figure 12B:
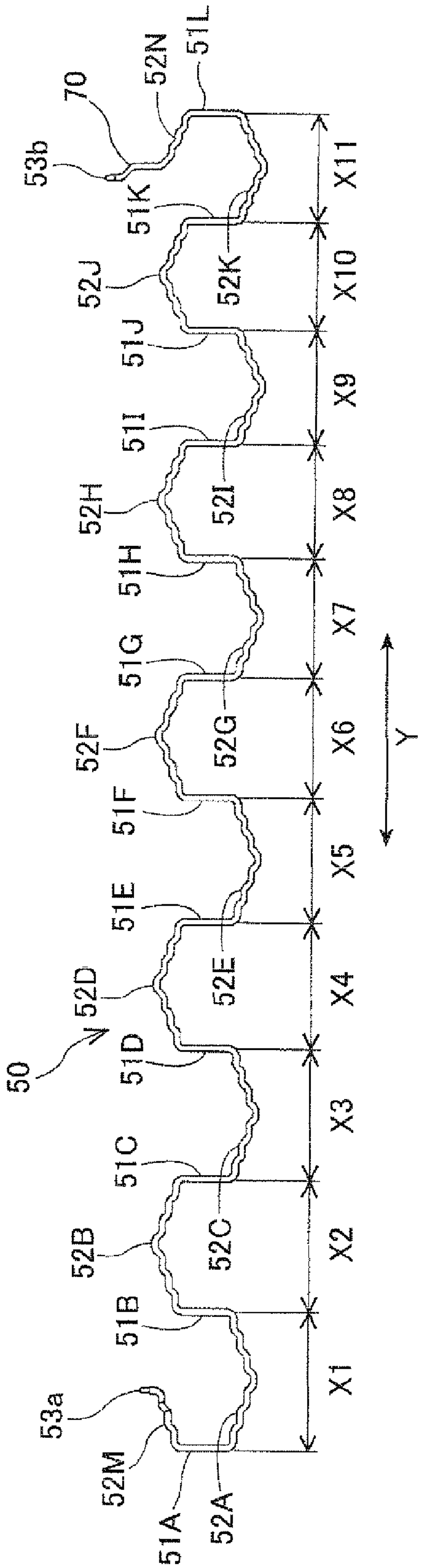
FIG. 12B is a front view of the one of the electric wires.

FIGS. 12A-12B together show the shape of each of the electric wires 50 before the electric wires 50 are rolled into a spiral shape as to be described later.

As shown in FIGS. 12A-12B, each of the electric wires 50 is substantially planar and wave-shaped to include a plurality of in-slot portions 51 and a plurality of turn portions 52. The in-slot portions 51 are spaced in the longitudinal direction Y of the electric wire 50 at predetermined pitches and extend perpendicular to the longitudinal direction Y. Each of the in-slot portions 51 is to be received in a corresponding one of the slots 31 of the stator core 30. Each of the turn portions 52 extends to connect a corresponding adjacent pair of the in-slot portions 51 and is to be located outside the slots 31 of the stator core 30.

Specifically, the plurality of in-slot portions 51 include, at least, a first in-slot portion 51A, a second in-slot portion 51B, and a third in-slot portion 51C. The first, second and third in-slot portions 51A, 51B, and 51C are to be respectively received in three different slots 31 of the stator core 30; the three slots 31 are circumferentially spaced at a pitch of six slots 31. On the other hand, the plurality of turn portions 52 include, at least, a first turn portion 52A and a second turn portion 52B. The first turn portion 52A connects the first and second in-slot portions 51A and 51B and is to be located on one axial side of the stator core 30 outside the slots 31. The second turn portion 52B connects the second and third in-slot portions 51B and 51C and is to be located on the other axial side of the stator core 30 outside the slots 31.

More specifically, in the present embodiment, as shown in FIGS. 12A-12B, the plurality of in-slot portions 51 include first to twelfth in-slot portions 51A-51L which are to be sequentially received in eight slots 31 that are circumferentially spaced at a pitch of six slots 31. In other words, the number of the in-slot portions 51 in each of the electric wires 50 is equal to 12. On the other hand, the plurality of turn portions 52 include first to eleventh turn portions 52A-52K which each connect a corresponding adjacent pair of the in-slot portions 51A-51L and are to be alternately located on the opposite axial sides of the stator core 30 outside the slots 31. In other words, the number of the turn portions 52 in each of the electric wires 50 is equal to 11.

Moreover, the predetermined pitches X between the in-slot portions 51A-51L in the longitudinal direction Y of the electric wire 50 gradually decrease in a direction from the first in-slot portion 51A to the twelfth in-slot portion 51L. That is, $X1>X2>X3>X4>X5>X6>X7>X8>X9>X10>X11$. In addition, the predetermined pitches X1-X11 are set based on the circumferential distances between the eight slots 31 of the stator core 30 in which the in-slot portions 51A-51L are to be received.

Each of the electric wires 50 further includes a pair of lead portions 53*a* and 53*b* that are respectively formed at opposite ends of the electric wire 50 for connecting the electric wire 50 with other electric wires 50. The lead portion 53*a* is connected to the first in-slot portion 51A via a half-turn portion 52M that extends from the first in-slot portion 51A to return inward (i.e., rightward in FIG. 12B) in the longitudinal direction Y of the electric wire 50. The length of the half-turn portion 52M is substantially half the length of the first turn portion 52A. Consequently, the lead portion 53*a* is offset inward (i.e., rightward in FIG. 12B) in the longitudinal direction Y from the first in-slot portion 51A by the length of the half-turn portion 52M. On the other hand, the lead portion 53*b* is connected to the twelfth in-slot portion 51L via a half-turn portion 52N that extends from the twelfth in-slot portion 51L to return inward (i.e., leftward in FIG. 12B) in the longitudinal direction Y of the electric wire 50. The length of the half-turn portion 52N is substantially half the length of the eleventh turn portion 52K. Consequently, the lead portion 53*b* is offset inward (i.e., leftward in FIG. 12B) in the longitudinal direction Y from the twelfth in-slot portion 51L by the length of the half-turn portion 52N. Further, the lead portion 53*b* is formed to include therein one of the crossover parts 70 described previously.

Furthermore, as shown in FIG. 12A, each of the turn portions 52 includes, substantially at the center thereof, a crank-shaped part 54 that is bent to offset the turn portion 52 in a direction perpendicular to both the longitudinal direction Y of the electric wire 50 and the extending direction of the in-slot portions 51. Consequently, with the crank-shaped parts 54, the electric wire 50 is stepped to successively offset the in-slot portions 51 in the direction perpendicular to both the longitudinal direction Y and the extending direction of the in-slot portions 51. It should be noted that the term "crank-shaped" is used here only for the purpose of describing the overall shape of the parts 54 and does not restrict the internal angles between adjacent sections of the parts 54 to 90°.

Figure 13A:
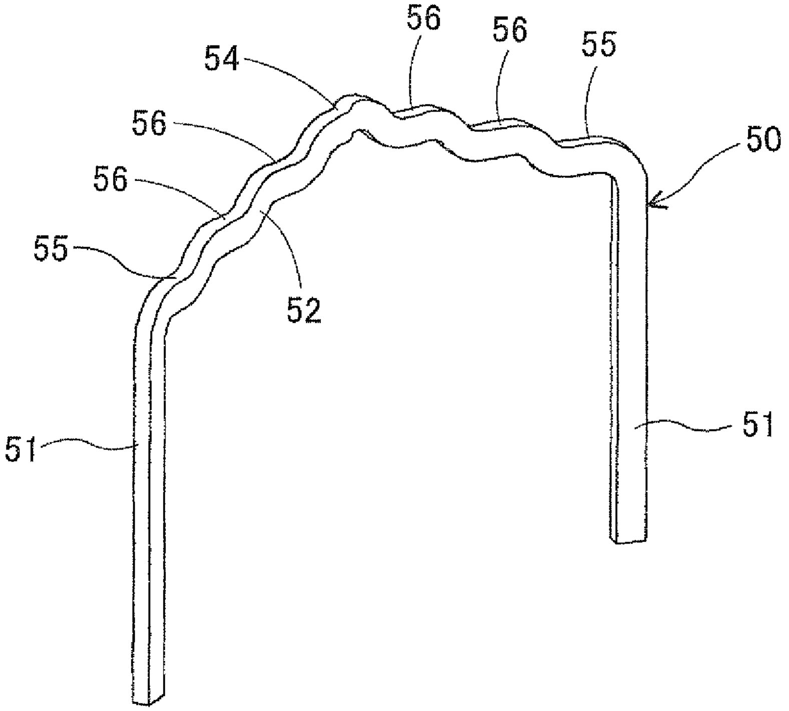
FIG. 13A is a perspective view illustrating a turn portion of one of the electric wires.
Figure 13B:
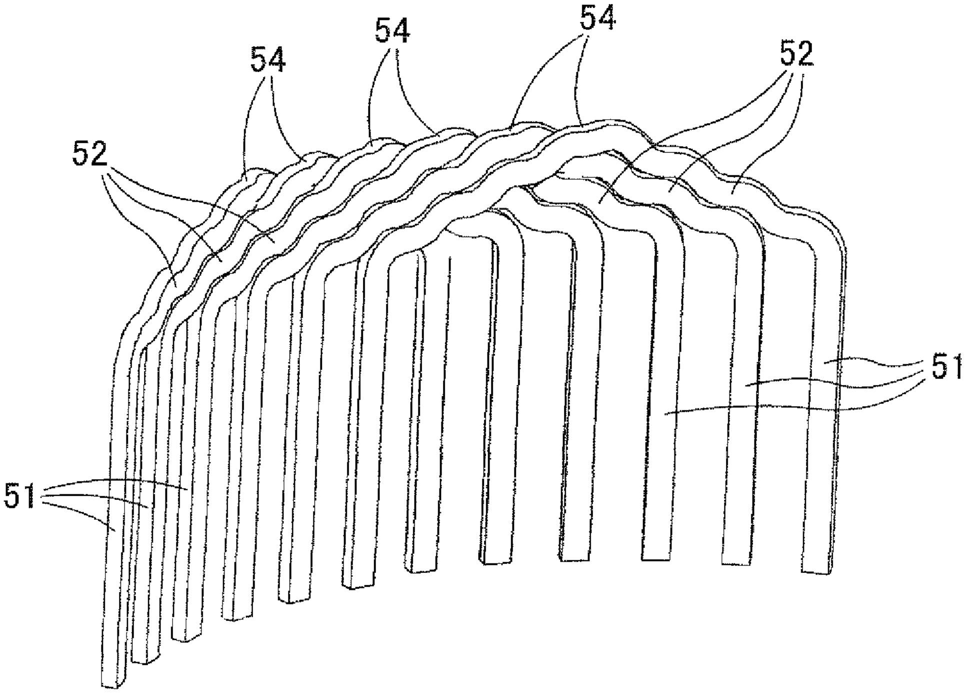
FIG. 13B is a perspective view illustrating a plurality of turn portions of the electric wires which are adjacent to one another.

Referring now to FIGS. 13A-13B, after forming the stator coil 40 with the electric wires 50 and assembling the stator core 30 to the stator coil 40, each of the turn portions 52 (i.e., 52A-52K) of the electric wires 50 is offset by the crank-shaped part 54 formed therein in a radial direction of the stator core 30. In addition, though not shown in FIGS. 13A-13B, each of the crank-shaped parts 54 formed in the turn portions 52 of the electric wires 50 extends parallel to a corresponding axial end face 30*a* of the stator core 30.

Further, in the present embodiment, the amount of radial offset made by each of the crank-shaped parts 54 is set to be equal to the radial thickness of the in-slot portions 51 of the electric wires 50. Here, the amount of radial offset made by each of the crank-shaped parts 54 is defined as the difference in radial position between the opposite ends of the crank-shaped part 54. Accordingly, for each of the electric wires 50, the difference in radial position between each adjacent pair of the in-slot portions 51, which are connected by a corresponding one of the turn portions 52, is equal to the radial thickness (i.e., thickness in the radial direction of the stator core 30) of the in-slot portions 51.

Setting the amount of radial offset as above, it is possible to arrange each adjacent pair of the turn portions 52 of the electric wires 50 in intimate contact with each other, as shown in FIG. 13B. As a result, the radial thickness of the coil end parts 42 of the stator coil 40 can be minimized. In addition, it is also possible to make each adjacent pair of the turn portions 52 of the electric wires 50 extend in the circumferential direction of the stator core 30 without interference therebetween.

Moreover, as shown in FIGS. 13A-13B, each of the turn portions 52 of the electric wires 50 includes a pair of shoulder parts 55 which respectively adjoin the pair of the in-slot portions 51 connected by the turn portion 52 and both extend substantially perpendicular to the pair of the in-slot portions 51 (or substantially parallel to the corresponding axial end face 30*a* of the stator core 30). Consequently, with the shoulder parts 55, the protruding height of each of the turn portions 52 from the corresponding axial end face 30*a* of the stator core 30 can be reduced. As a result, the axial length of the coil end parts 42 of the stator coil 40 can be reduced. In addition, the coil end parts 42 of the stator coil 40 are each comprised of those of the turn portions 52 of the electric wires 50 which are located on the same axial side of the stator core 30.

Furthermore, in the present embodiment, there is specified the following dimensional relationship: $d1<d2$, where d1 is the length of each of the shoulder parts 55 of the electric wires 50 in the circumferential direction of the stator core 30 and d2 is the distance between each circumferentially-adjacent pair of the slots 31 of the stator core 30.

Specifying the above relationship, it is possible to prevent interference between each pair of the turn portions 52 of the electric wires 50 which respectively protrude from one circumferentially-adjacent pair of the slots 31 of the stator core 30. Consequently, it is possible to prevent both the axial length and radial thickness of the coil end parts 42 of the stator coil 40 from being increased for preventing the above-described interference.

Moreover, as shown in FIGS. 13A-13B, each of the turn portions 52 of the electric wires 50 further includes two shoulder parts 56 between the crank-shaped part 54 and each of the shoulder parts 55. Accordingly, each of the turn portions 52 of the electric wires 50 includes one crank-shaped part 54, two shoulder parts 55, and four shoulder parts 56. Each of the shoulder parts 56 extends, like the shoulder parts 55, substantially perpendicular to the in-slot portions 51 (or substantially parallel to the corresponding axial end face 30*a* of the stator core 30). Consequently, with the shoulder parts 56, the protruding height of each of the turn portions 52 from the corresponding axial end face 30*a* of the stator core 30 can be further reduced. As a result, the axial length of the coil end parts 42 of the stator coil 40 can be further reduced. In addition, each of the turn portions 52 of the electric wires 50 can be seen as being stepped on both sides of the crank-shaped part 54 to reduce its protruding height from the corresponding axial end face 30*a* of the stator core 30.

In the present embodiment, the stator coil 40 is formed with the 48 electric wires 50 as shown in FIGS. 12A-12B. It should be noted that the crossover parts 70 may be omitted from some of the electric wires 50 for facilitating the formation of the U-phase, V-phase, and W-phase output terminals and the U-phase, V-phase, and W-phase neutral terminals in the stator coil 40. However, in any case, it is preferable that all of the electric wires 50 have the same shape at least between the lead portions 53*a* and 53*b*.

Figure 7:
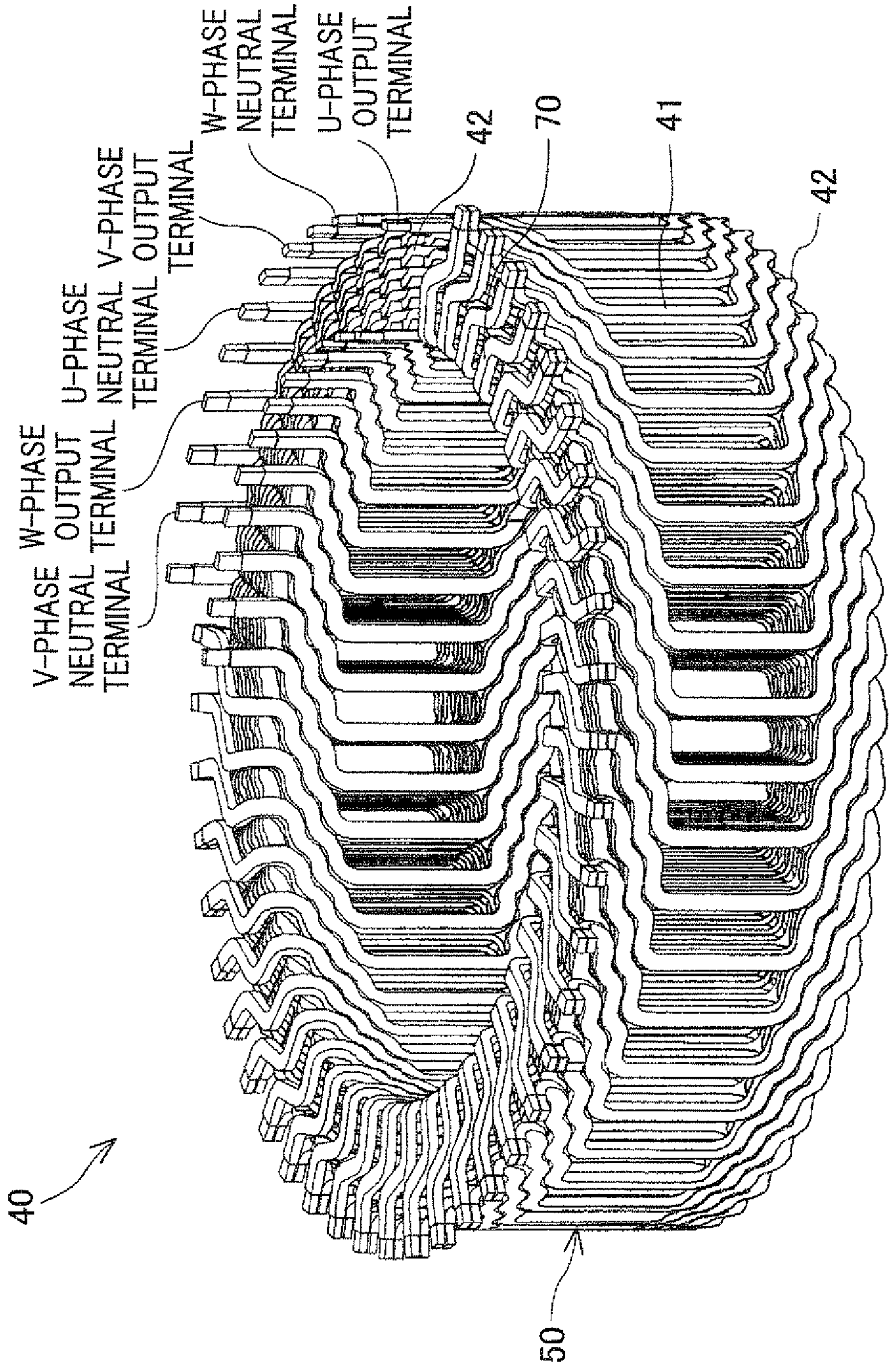
FIG. 7 is a perspective view of a stator coil of the stator.
Figure 8:
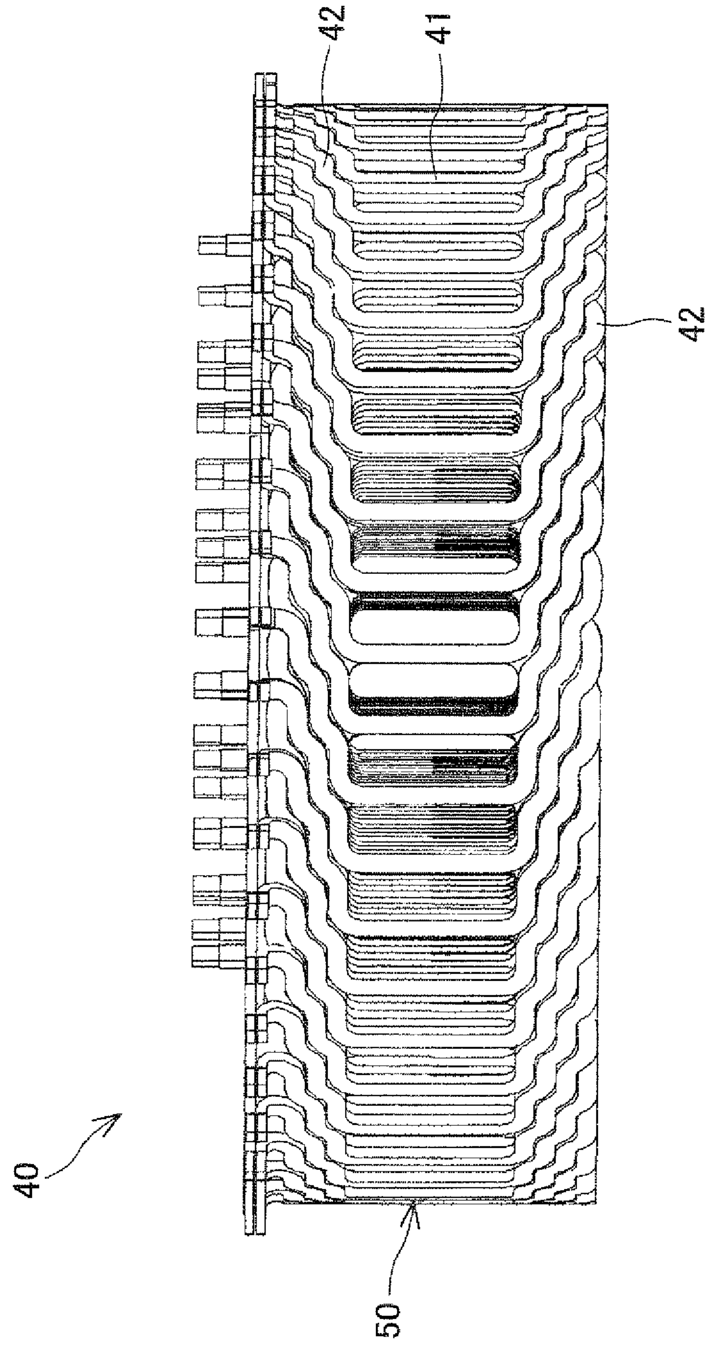
FIG. 8 is a side view of the stator coil.

As described previously, each of the turn portions 52 of the electric wires 50 includes, substantially at the center thereof, the crank-shaped part 54 by which the turn portions 52 is radially offset by the radial thickness of the in-slot portions 51. Accordingly, for each of the electric wires 50, the difference in radial position between each adjacent pair of the in-slot portions 51, which are connected by a corresponding one of the turn portions 52, is equal to the radial thickness of the in-slot portions 51. Moreover, for each of the electric wires 50, the first in-slot portion 51A is located most radially outward while the twelfth in-slot portion 51L is located most radially inward; the predetermined pitches X between the in-slot portions 51A-51L gradually decrease in a direction from the first in-slot portion 51A to the twelfth in-slot portion 51L (see FIG. 12B). Consequently, those of the in-slot portions 51 of the electric wires 50 which are stacked in a radial direction of the stator coil 40 (or a radial direction of the stator core 30) can be aligned straight in the radial direction, thereby allowing the stator coil 40 to have a substantially perfect hollow-cylindrical shape as shown in FIGS. 7 and 8.

Furthermore, all of the ith in-slot portions 51 of the 48 electric wires 50 are located respectively in the 48 slots 31 of the stator core 30 at the same radial position, where $i=1, 2, \ldots, 12$. For example, all of the first in-slot portions 51A of the 48 electric wires 50 are located respectively in the 48 slots 31 and positioned most radially outward in the respective slots 31; all of the twelfth in-slot portions 51L of the 48 electric wires 50 are located respectively in the 48 slots 31 and positioned most radially inward in the respective slots 31. With the above location of the in-slot portions 51 of the electric wires 50, both the outside and inside diameters of the stator coil 40 can be made uniform in the circumferential direction of the stator core 30.

Figure 14:
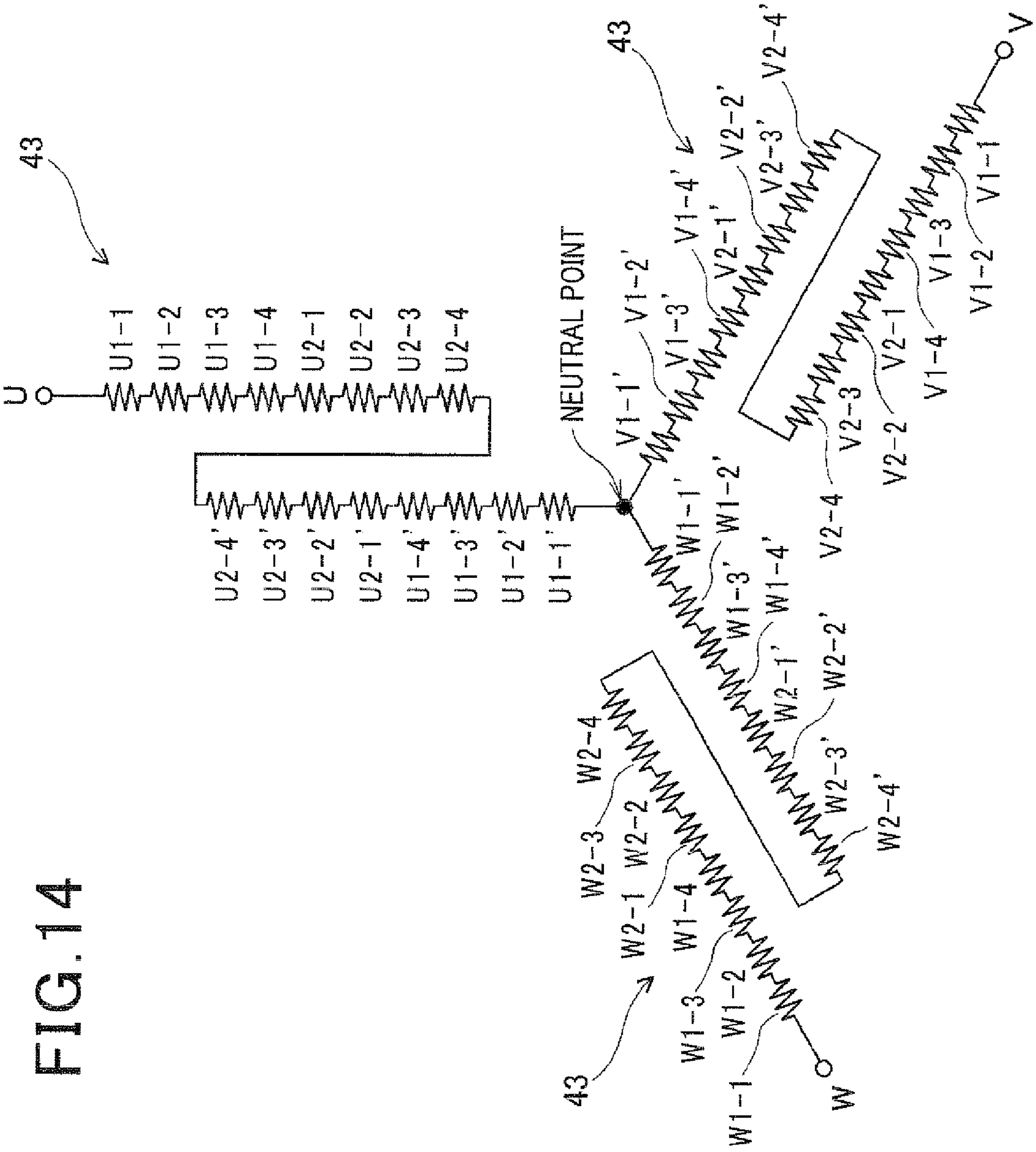
FIG. 14 is a circuit diagram of the stator coil.

In the present embodiment, as shown in FIG. 14, the stator coil 40 is formed as a three-phase coil which is comprised of three phase windings (i.e., U-phase, V-phase, and W-phase windings) 43. Each of the U-phase, V-phase, and W-phase windings 43 is formed by serially connecting 16 electric wires 50. Further, the U-phase output and neutral terminals are respectively formed at the opposite ends of the U-phase winding 43; the V-phase output and neutral terminals are respectively formed at the opposite ends of the V-phase winding 43; and the W-phase output and neutral terminals are respectively formed at the opposite ends of the W-phase winding 43. Furthermore, the U-phase, V-phase, and W-phase windings 43 are Y-connected to define a neutral point therebetween. That is, the U-phase, V-phase, and W-phase neutral terminals of the U-phase, V-phase, and W-phase windings 43 are joined together at the neutral point. Consequently, three-phase AC power is input to or output from the stator coil 40 via the U-phase, V-phase, and W-phase output terminals.

Figure 15:
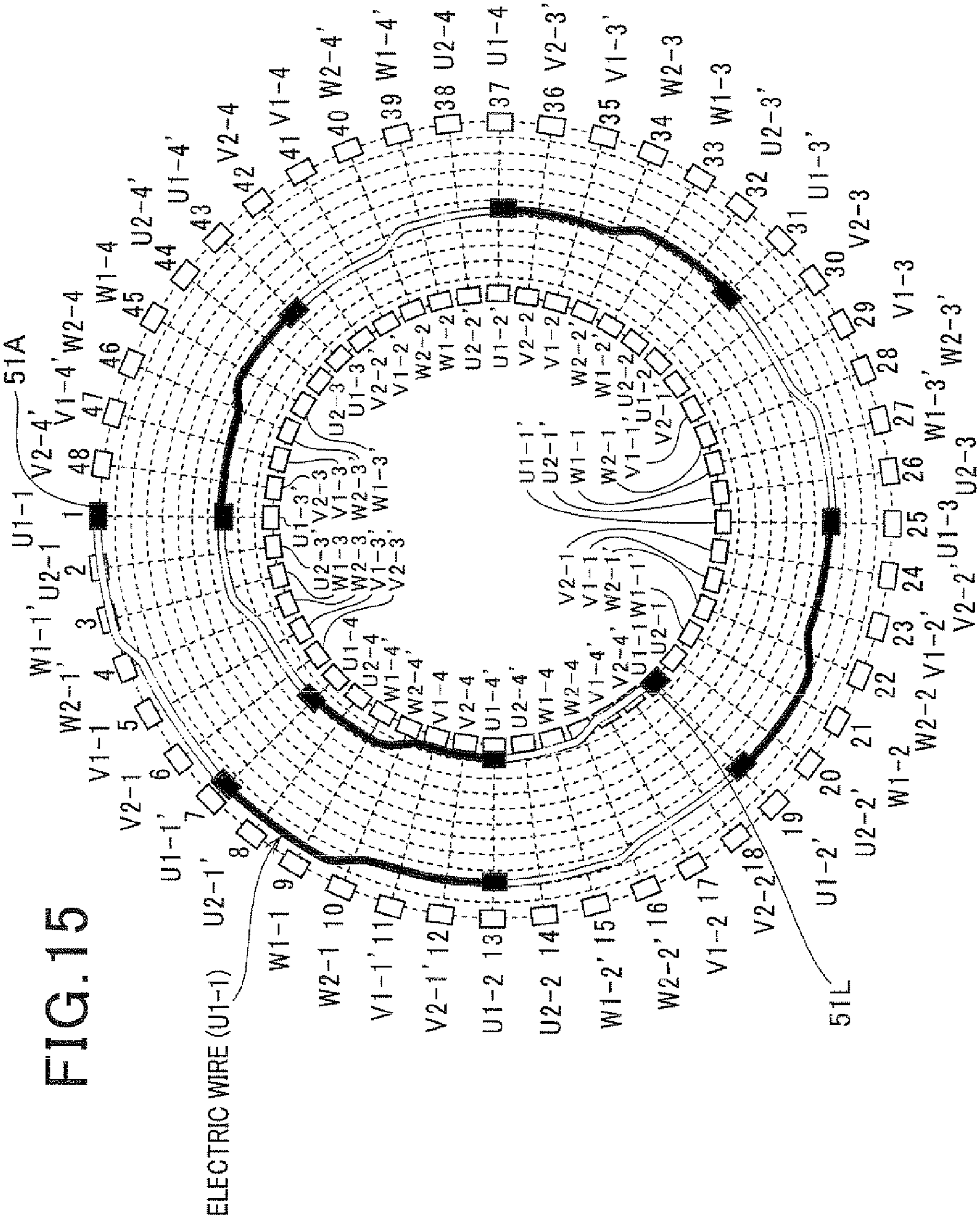
FIG. 15 is a schematic view illustrating the location of the radially-outermost in-slot portion of each of the electric wires in the stator core.
Figure 16:
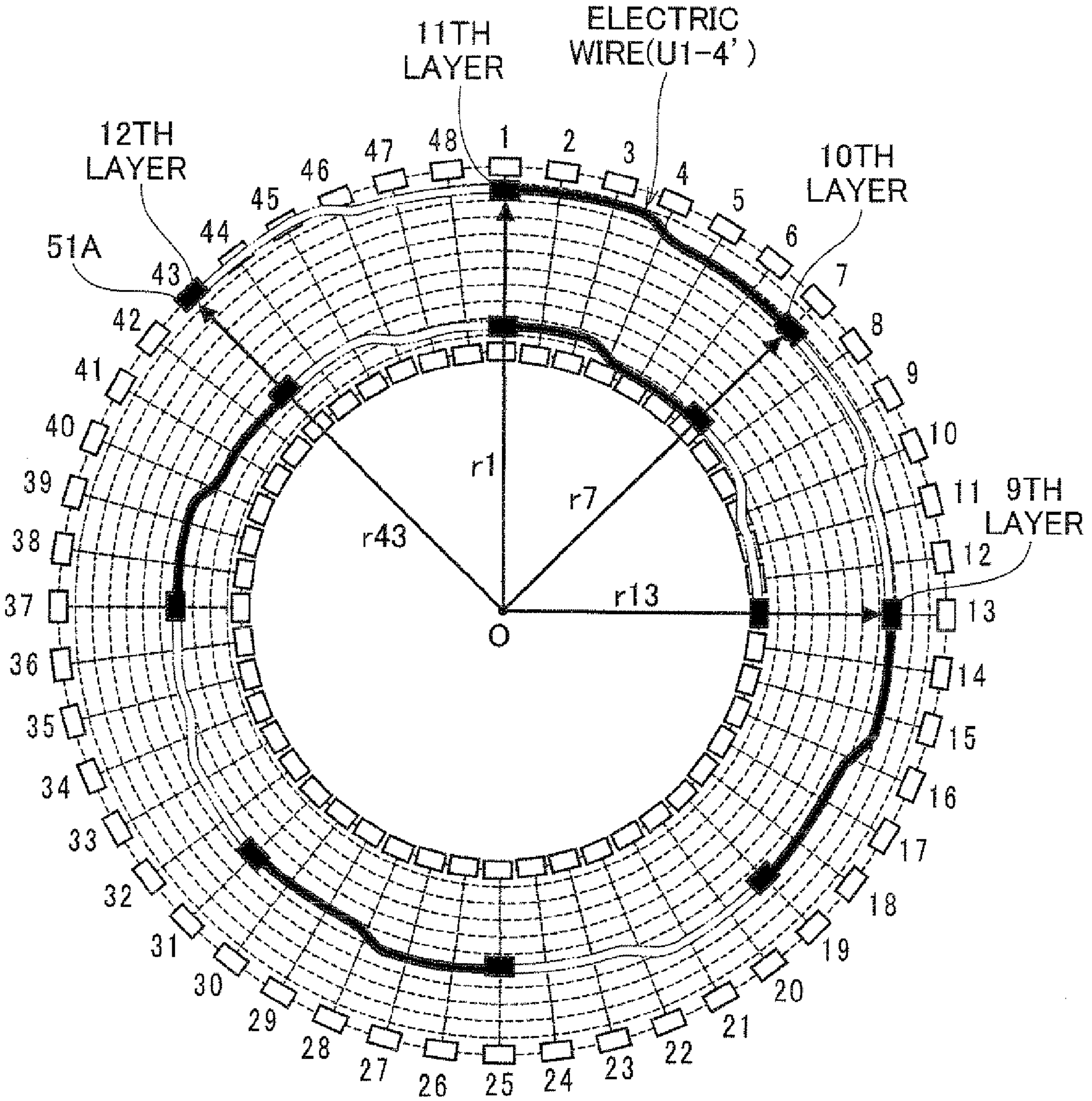
FIG. 16 is a schematic view illustrating the manner of extension of the electric wire labeled (U1-4') when viewed along the longitudinal axis O of the stator core.

In FIGS. 15 and 16, the intersections between 12 dashed-line circles and 48 radially-extending dashed lines represent the positions of the in-slot portions 51 of the electric wires 50. In addition, among the positions of the in-slot portions 51, only the radially outermost and radially innermost ones are denoted by rectangles.

It can be seen from FIGS. 15 and 16 that in the present embodiment, in each of the slots 31 of the stator core 30, the in-slot portions 51 of the electric wires 50 are radially stacked in 12 layers.

Further, in FIGS. 15 and 16, the numbers 1-48 of the slots 31 of the stator core 30 are respectively shown radially outside the 48 radially-extending dashed lines. In addition, in FIG. 15, each of the 48 electric wires 50 is labeled radially outside the slot 31 in which the first in-slot portion 51A of the electric wire 50 is located most radially outward (i.e., located at the twelfth layer in the slot 31); each of the 48 electric wires 50 is also labeled radially inside the slot 31 in which the twelfth in-slot portion 51L of the electric wire 50 is located most radially inward (i.e., located at the first layer in the slot 31).

In the present embodiment, each of the U-phase, V-phase, and W-phase windings 43 of the stator coil 40 is formed with first and second electric wire groups each consisting of eight electric wires 50. The in-slot portions 51 of the electric wires 50 of the first group are received in eight common slots 31 of the stator core 30. Similarly, the in-slot portions 51 of the electric wires 50 of the second group are also received in another eight common slots 31 of the stator core 30. That is, the in-slot portions 51 of the electric wires 50 of the first group are received in different slots 31 from the in-slot portions 51 of the electric wires 50 of the second group.

For example, the U-phase winding 43 is formed with a first electric wire group, which consists of the electric wires 50 labeled (U1-1) to (U1-4) and (U1-1') to (U1-4'), and a second electric wire group that consists of the electric wires 50 labeled (U2-1) to (U2-4) and (U2-1') to (U2-4'). The in-slot portions 51 of the (U1-1) to (U1-4) and (U1-1') to (U1-4') electric wires 50 are received in the Nos. 1, 7, 13, 19, 25, 31, 37, and 43 slots 31 of the stator core 30. On the other hand, the in-slot portions 51 of the (U2-1) to (U2-4) and (U2-1') to (U2-4') electric wires 50 are received in the Nos. 2, 8, 14, 20, 26, 32, 38, and 44 slots 31 of the stator core 30.

FIG. 15 illustrates, from one axial side of the stator core 30, the arrangement of each of the 48 electric wires 50 by taking the (U1-1) electric wire 50 as an example. Specifically, in FIG. 15, the positions of the in-slot portions 51 of the (U1-1) electric wire 50 are denoted by black rectangles; those of the turn portions 52 of the (U1-1) electric wire 50 which are located on the one axial side of the stator core 30 (i.e., on the front side of the paper surface of FIG. 15) are denoted by circumferentially-extending heavy lines; and those of the turn portions 52 of the (U1-1) electric wire 50 which are located on the other axial side of the stator core 30 (i.e., on the rear side of the paper surface of FIG. 15) are denoted by circumferentially-extending two-dot dashed lines. As seen from FIG. 15, for the (U1-1) electric wire 50, the first in-slot portion 51A is located at the twelfth layer (i.e., the radially outermost layer) in the No. 1 slot 31; the twelfth in-slot portion 51L is located at the first layer (i.e., the radially innermost layer) in the No. 19 slot 31; the first to the twelfth in-slot portions 51A-51L are circumferentially spaced at a six-slot pitch; and the radial positions of the in-slot portions 51A-51L are successively offset radially inward by one layer each time.

FIG. 16 illustrates, from the other axial side of the stator core 30, the arrangement of each of the 48 electric wires 50 by taking the (U1-4') electric wire 50 as an example. Specifically, in FIG. 16, the positions of the in-slot portions 51 of the (U1-4') electric wire 50 are denoted by black rectangles; those of the turn portions 52 of the (U1-4') electric wire 50 which are located on the other axial side of the stator core 30 (i.e., on the front side of the paper surface of FIG. 16) are denoted by circumferentially-extending heavy lines; and those of the turn portions 52 of the (U1-4') electric wire 50 which are located on the one axial side of the stator core 30 (i.e., on the rear side of the paper surface of FIG. 16) are denoted by circumferentially-extending two-dot dashed lines. As seen from FIG. 16, for the (U1-4') electric wire 50, the first in-slot portion 51A is located at the twelfth layer in the No. 43 slot 31; the twelfth in-slot portion 51L is located at the first layer in the No. 13 slot 31; the first to the twelfth in-slot portions 51A-51L are circumferentially spaced at a six-slot pitch; and the radial positions of the in-slot portions 51A-51L are successively offset by one layer each time.

As described previously, in the present embodiment, the stator core 30 has the 48 slots 31 formed therein, while the stator coil 40 is formed with the 48 electric wires 50. The electric wires 50 are mounted on the stator core 30 so that they are offset from one another in the circumferential direction of the stator core 30 by one slot pitch of the stator core 30. Consequently, the first in-slot portions 51A of the 48 electric wires 50 are respectively located at the radially outermost layers (i.e., the twelfth layers) in the 48 slots 31; the twelfth in-slot portions 51L of the 48 electric wires 50 are respectively located at the radially innermost layers (i.e., the first layers) in the 48 slots 31.

FIG. 17 shows both the label of the electric wire 50 located at the radially outermost layer and the label of the electric wire 50 located at the radially innermost layer in each of the slots 31 of the stator core 30.

In the present embodiment, for each of the 48 electric wires 50 forming the stator coil 40, the radial distances from the axis O of the stator core 30 to the in-slot portions 51 of the electric wire 50 successively decrease in the sequence from the first in-slot portion 51A to the twelfth in-slot portion 51L. Moreover, for each of the 48 electric wires 50, the difference in radial distance from the axis O of the stator core 30 between each adjacent pair of the in-slot portions 51, which are connected by a corresponding one of the turn portions 52, is equal to the radial thickness of the in-slot portions 51.

For example, referring back to FIG. 16, for the (U1-4') electric wire 50, there is satisfied the following relationship: r43>r1>r7>r13. Here, r43 represents the radial distance from the axis O of the stator core 30 to the first in-slot portion 51A that is located at the twelfth layer in the No. 43 slot 31; r1 represents the radial distance from the axis O to the second in-slot portion 51B that is located at the eleventh layer in the No, 1 slot 31; r7 represents the radial distance from the axis O to the third in-slot portion 51C that is located at the tenth layer in the No. 7 slot 31; and r13 represents the radial distance from the axis O to the fourth in-slot portion 51D that is located at the ninth layer in the No. 13 slot 31. Further, the radial distances r43, r1, r7, and r13 successively decrease in decrements of the radial thickness of the in-slot portions 51.

Figure 18:
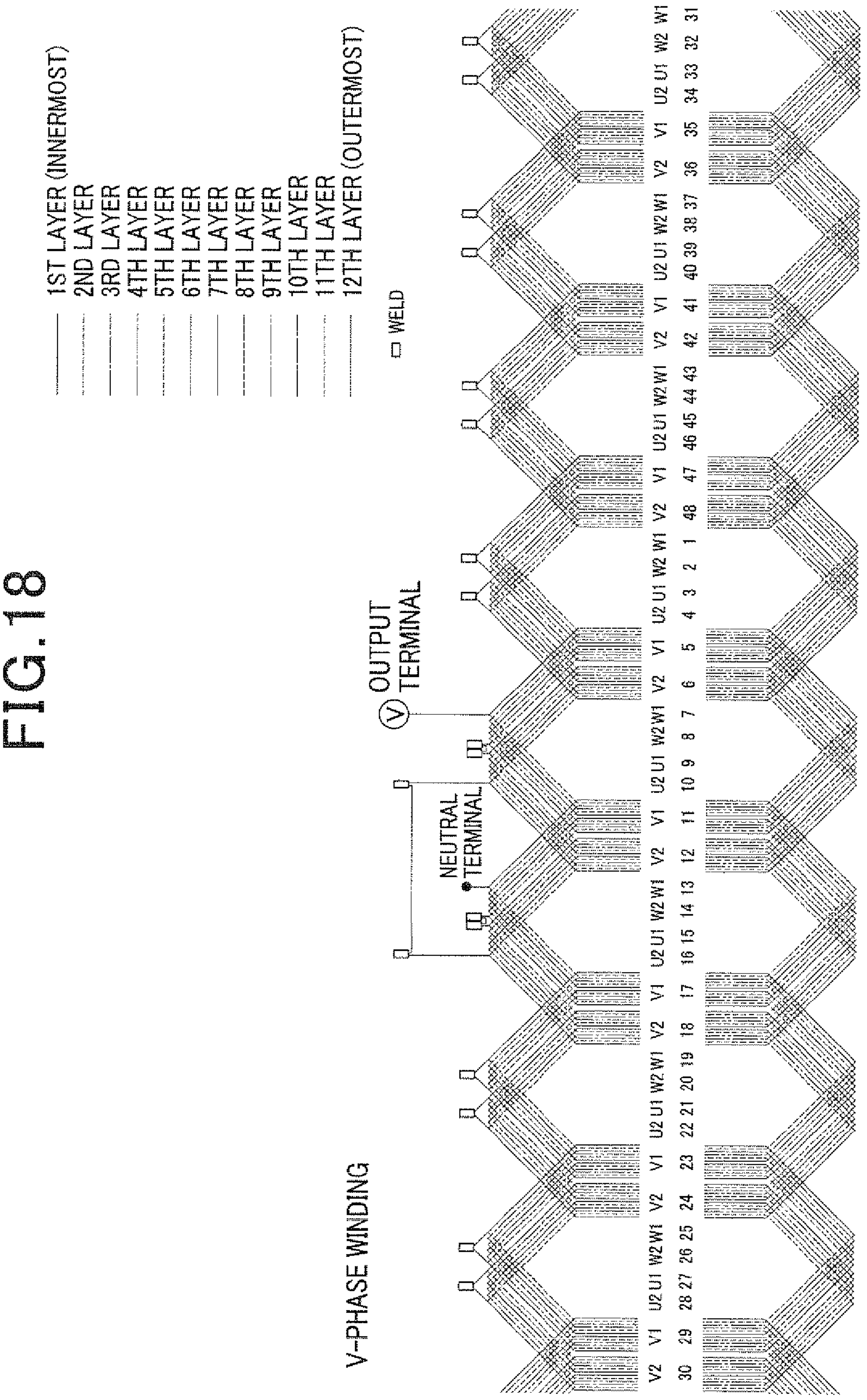
FIG. 18 is a schematic view illustrating the connection between those of the electric wires which together form a V-phase winding of the stator coil when viewed from the radially inner side of the stator core.

Next, with reference to FIGS. 14 and 17-18, the manner of serially connecting the 16 electric wires 50 for forming the V-phase winding 43 of the stator coil 40 will be described. In addition, it should be noted that the electric wires 50 for forming the U-phase and W-phase windings 43 of the stator coil 40 are also connected in the same manner as those for forming the V-phase winding 43.

As shown in FIG. 14, the V-phase winding 43 is formed by serially connecting the (V1-1) to (V1-4), (V1-1') to (V1-V4'), (V2-1) to (V2-4), and (V2-1') to (V2-4') electric wires 50.

Specifically, to the V-phase output terminal, there is connected the first in-slot portion 51A-side end of the (V1-1) electric wire 50. Moreover, as shown in FIGS. 17 and 18, for the (V1-1) electric wire 50, the first in-slot portion 51A is located at the radially outermost layer (i.e., the twelfth layer) in the No. 5 slot 31 of the stator core 30, while the twelfth in-slot portion 51L is located at the radially innermost layer (i.e., the first layer) in the No. 23 slot 31.

To the twelfth in-slot portion 51L-side end of the (V1-1) electric wire 50, there is connected the first in-slot portion 51A-side end of the (V1-2) electric wire 50. Moreover, for the (V1-2) electric wire 50, the first in-slot portion 51A is located at the radially outermost layer in the No. 17 slot 31, while the twelfth in-slot portion 51L is located at the radially innermost layer in the No. 35 slot 31.

To the twelfth in-slot portion 51L-side end of the (V1-2) electric wire 50, there is connected the first in-slot portion 51A-side end of the (V1-3) electric wire 50. Moreover, for the (V1-3) electric wire 50, the first in-slot portion 51A is located at the radially outermost layer in the No. 29 slot 31, while the twelfth in-slot portion 51L is located at the radially innermost layer in the No. 47 slot 31.

To the twelfth in-slot portion 51L-side end of the (V1-3) electric wire 50, there is connected the first in-slot portion 51A-side end of the (V1-4) electric wire 50. Moreover, for the (V1-4) electric wire 50, the first in-slot portion 51A is located at the radially outermost layer in the No. 41 slot 31, while the twelfth in-slot portion 51L is located at the radially innermost layer in the No. 11 slot 31.

To the twelfth in-slot portion 51L-side end of the (V1-4) electric wire 50, there is connected the first in-slot portion 51A-side end of the (V2-1) electric wire 50. Moreover, for the (V2-1) electric wire 50, the first in-slot portion 51A is located at the radially outermost layer in the No. 6 slot 31, while the twelfth in-slot portion 51L is located at the radially innermost layer in the No. 24 slot 31.

To the twelfth in-slot portion 51L-side end of the (V2-1) electric wire 50, there is connected the first in-slot portion 51A-side end of the (V2-2) electric wire 50. Moreover, for the (V2-2) electric wire 50, the first in-slot portion 51A is located at the radially outermost layer in the No. 18 slot 31, while the twelfth in-slot portion 51L is located at the radially innermost layer in the No. 36 slot 31.

To the twelfth in-slot portion 51L-side end of the (V2-2) electric wire 50, there is connected the first in-slot portion 51A-side end of the (V2-3) electric wire 50. Moreover, for the (V2-3) electric wire 50, the first in-slot portion 51A is located at the radially outermost layer in the No. 30 slot 31, while the twelfth in-slot portion 51L is located at the radially innermost layer in the No. 48 slot 31.

To the twelfth in-slot portion 51L-side end of the (V2-3) electric wire 50, there is connected the first in-slot portion 51A-side end of the (V2-4) electric wire 50. Moreover, for the (V2-4) electric wire 50, the first in-slot portion 51A is located at the radially outermost layer in the No. 42 slot 31, while the twelfth in-slot portion 51L is located at the radially innermost layer in the No. 12 slot 31.

To the twelfth in-slot portion 51L-side end of the (V2-4) electric wire 50, there is connected the twelfth in-slot portion 51L-side end of the (V2-4') electric wire 50. Moreover, for the (V2-4') electric wire 50, the first in-slot portion 51A is located at the radially outermost layer in the No. 48 slot 31, while the twelfth in-slot portion 51L is located at the radially innermost layer in the No. 18 slot 31.

To the first in-slot portion 51A-side end of the (V2-4') electric wire 50, there is connected the twelfth in-slot portion 51L-side end of the (V2-3') electric wire 50. Moreover, for the (V2-3') electric wire 50, the first in-slot portion 51A is located at the radially outermost layer in the No. 36 slot 31, while the twelfth in-slot portion 51L is located at the radially innermost layer in the No. 6 slot 31.

To the first in-slot portion 51A-side end of the (V2-3') electric wire 50, there is connected the twelfth in-slot portion 51L-side end of the V2-2') electric wire 50. Moreover, for the (V2-2') electric wire 50, the first in-slot portion 51A is located at the radially outermost layer in the No. 24 slot 31, while the twelfth in-slot portion 51L is located at the radially innermost layer in the No. 42 slot 31.

To the first in-slot portion 51A-side end of the (V2-2') electric wire 50, there is connected the twelfth in-slot portion 51L-side end of the (V2-1') electric wire 50. Moreover, for the (V2-1') electric wire 50, the first in-slot portion 51A is located at the radially outermost layer in the No. 12 slot 31, while the twelfth in-slot portion 51L is located at the radially innermost layer in the No. 30 slot 31.

To the first in-slot portion 51A-side end of the (V2-1') electric wire 50, there is connected the twelfth in-slot portion 51L-side end of the (V1-4') electric wire 50. Moreover, for the (V1-4') electric wire 50, the first in-slot portion 51A is located at the radially outermost layer in the No. 47 slot 31, while the twelfth in-slot portion 51L is located at the radially innermost layer in the No. 17 slot 31.

To the first in-slot portion 51A-side end of the (V1-4') electric wire 50, there is connected the twelfth in-slot portion 51L-side end of the (V1-3') electric wire 50. Moreover, for the (V1-3') electric wire 50, the first in-slot portion 51A is located at the radially outermost layer in the No. 35 slot 31, while the twelfth in-slot portion 51L is located at the radially innermost layer in the No. 5 slot 31.

To the first in-slot portion 51A-side end of the (V1-3') electric wire 50, there is connected the twelfth in-slot portion 51L-side end of the (V1-2') electric wire 50. Moreover, for the (V1-2') electric wire 50, the first in-slot portion 51A is located at the radially outermost layer in the No. 23 slot 31, while the twelfth in-slot portion 51L is located at the radially innermost layer in the No. 41 slot 31.

To the first in-slot portion 51A-side end of the (V1-2') electric wire 50, there is connected the twelfth in-slot portion 51L-side end of the (V1-1') electric wire 50. Moreover, for the (V1-1') electric wire 50, the first in-slot portion 51A is located at the radially outermost layer in the No. 11 slot 31, while the twelfth in-slot portion 51L is located at the radially innermost layer in the No. 29 slot 31. In addition, the first in-slot portion 51A-side end of the (V1-1') electric wire 50 is connected to the V-phase neutral terminal of the stator coil 40.

Further, as described previously, each of the electric wires 50 has the lead portion 53*a* formed at the first in-slot portion 51A-side end thereof and the lead portion 53*b* formed at the twelfth in-slot portion 51L-side end thereof (see FIGS. 12A-12B). The lead portion 53*a* is connected to the first in-slot portion 51A via the half-turn portion 52M, and the lead portion 53*b* is connected to the twelfth in-slot portion 51L via the half-turn portion 52N. The lead portion 53*b* also has the crossover part 70 formed therein. In the present embodiment, the connection between the electric wires 50 is made by welding corresponding pairs of the lead portions 53*a* and 53*b* of the electric wires 50.

For example, the (V1-1) electric wire 50 has the first in-slot portion 51A located at the radially outermost layer in the No. 5 slot 31 of the stator core 30 and the twelfth in-slot portion 51L located at the radially innermost layer in the No. 23 slot 31. The lead portion 53*b* of the (V1-1) electric wire 50 is offset, by the length of the half-turn portion 52N in the circumferential direction of the stator core 30, from the No. 23 slot 31 to the vicinity of the No. 20 slot 31. On the other hand, the (V1-2) electric wire 50 has the first in-slot portion 51A located at the radially outermost layer in the No. 17 slot 31 and the twelfth in-slot portion 51L located at the radially innermost layer in the No. 35 slot 31. The lead portion 53*a* of the (V1-2) electric wire 50 is offset, by the length of the half-turn portion 52M in the circumferential direction of the stator core 30, from the No. 17 slot 31 to the vicinity of the No. 20 slot 31. Further, as shown in FIGS. 7-10, the lead portion 53*b* of the (V1-1) electric wire 50 is bent radially outward at a substantially right angle to extend from the radially inner periphery of the stator coil 40 to the lead portion 53*a* of the (V1-2) electric wire 50 which is located on the radially outer periphery of the stator coil 40; then, the lead portion 53*b* of the (V1-1) electric wire 50 is welded to the lead portion 53*a* of the (V1-2) electric wire 50. In other words, the twelfth in-slot portion 51L-side end of the (V1-1) electric wire 50 is joined to the first in-slot portion 51A-side end of the (V1-2) electric wire 50 by welding.

Moreover, in the present embodiment, all of the corresponding pairs of the lead portions 53*a* and 53*b* of the electric wires 50 are welded radially outside the radially outermost turn portions 52 of the electric wires 50. To this end, each of the lead portions 53*b* of the electric wires 50 is configured to include the crossover part 70 that crosses over the annular axial end face of the stator coil 40 (more specifically, the annular axial end face of the coil end part 42 of the stator coil 40 which is comprised of the turn portions 52 of the electric wires 50) from the radially inside to the radially outside of the axial end face. Consequently, it is possible to reliably prevent the twelfth in-slot portions 51L of the electric wires 50, which are located most radially inward in the slots 31 of the stator core 30, from protruding radially inward. As a result, it is possible to reliably prevent the stator coil 40 from interfering with the rotor 7 of the electric rotating machine 1 which is located radially inside the stator 20.

Figure 9:
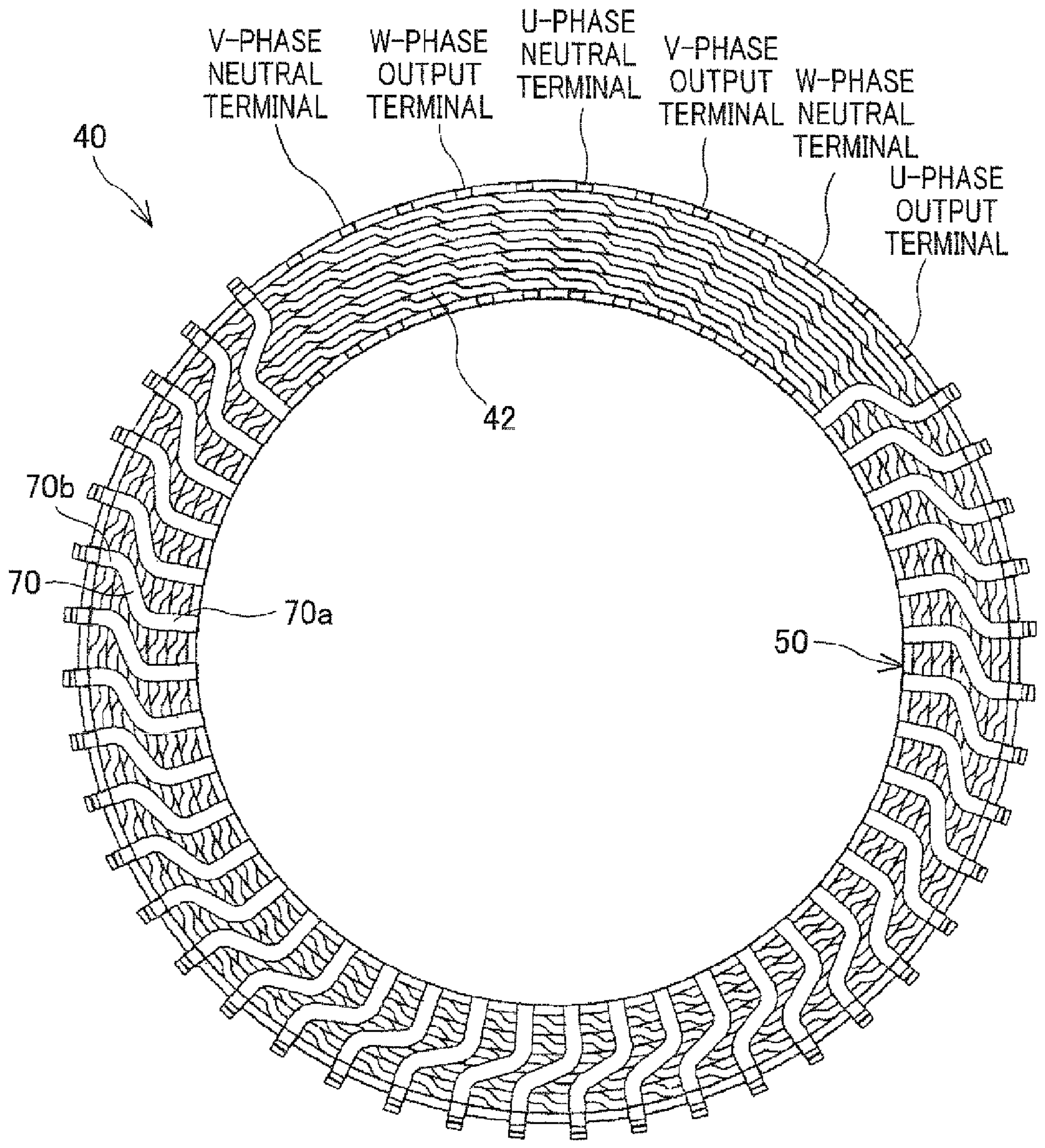
FIG. 9 is a top view of the stator coil.
Figure 10:
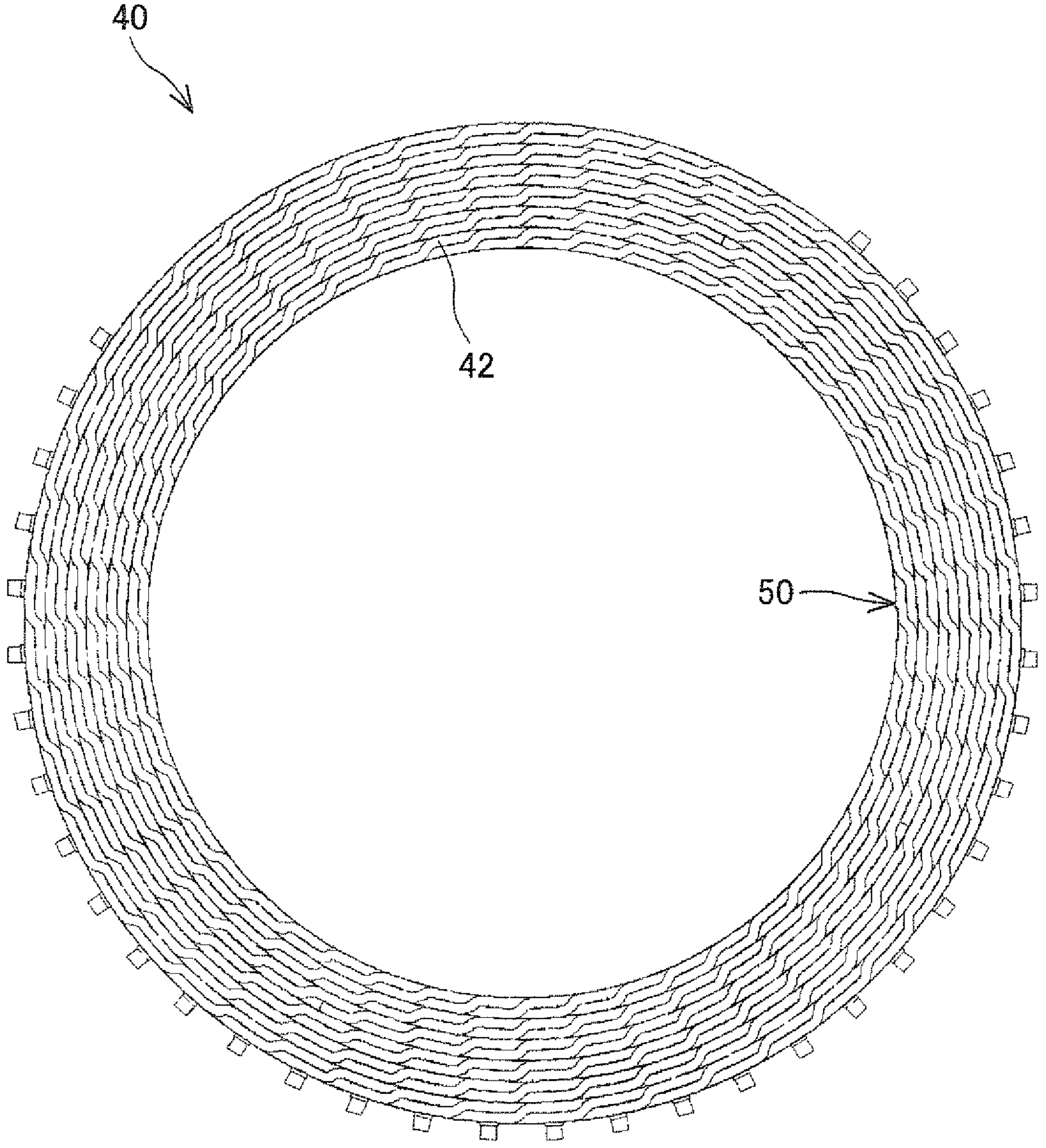
FIG. 10 is a bottom view of the stator coil.

Furthermore, in the present embodiment, as shown in FIG. 9, each of the crossover parts 70 of the electric wires 50 is crank-shaped to include a pair of radially-extending end sections 70*a* and 70*b*. With such a shape, it is possible to facilitate the bending of the lead portions 53*b* of the electric wires 50 for forming the crossover parts 70 and the welding of the corresponding pairs of the lead portions 53*a* and 53*b* of the electric wires 50.

In addition, as shown in FIGS. 7 and 9, on the annular axial end face of the stator coil 40, the crossover parts 70 occupy substantially ¾ of the full angular range of the axial end face; the full angular range is 360°. Further, within the remaining ¼ of the full angular range, there are sequentially arranged the V-phase neutral terminal, the W-phase output terminal, the U-phase neutral terminal, the V-phase output terminal, the W-phase neutral terminal, and the U-phase output terminal of the stator coil 40. That is, on the axial end face of the stator coil 40, the U-phase, V-phase, and W-phase output terminals are arranged in the same angular range as the U-phase, V-phase, and W-phase neutral terminals; the crossover parts 70 are arranged in a different angular range from the U-phase, V-phase, and W-phase output terminals and the U-phase, V-phase, and W-phase neutral terminals.

The stator core 30 is assembled to the above-described stator coil 40 by inserting the tooth portions 33 of the stator core segments 32 respectively into the spaces formed between the stacks of the in-slot portions 51 of the electric wires 50 from the radially outside of the stator coil 40. Consequently, each of the in-slot portions 51 of the electric wires 50 forming the stator coil 40 is received in a corresponding one of the slots 31 of the stator core 30. More specifically, for each of the electric wires 50, each adjacent pair of the in-slot portions 51 are respectively received in a corresponding pair of the slots 31 of the stator core 30 which are circumferentially spaced at a six-slot pitch. Moreover, each of the turn portions 52, which connects a corresponding pair of the in-slot portions 51, protrudes from a corresponding one of the axial end faces of the stator core 30.

After having described the configuration of the stator 20, a method of manufacturing the stator 20 according to the present embodiment will be described hereinafter.

Figure 19:
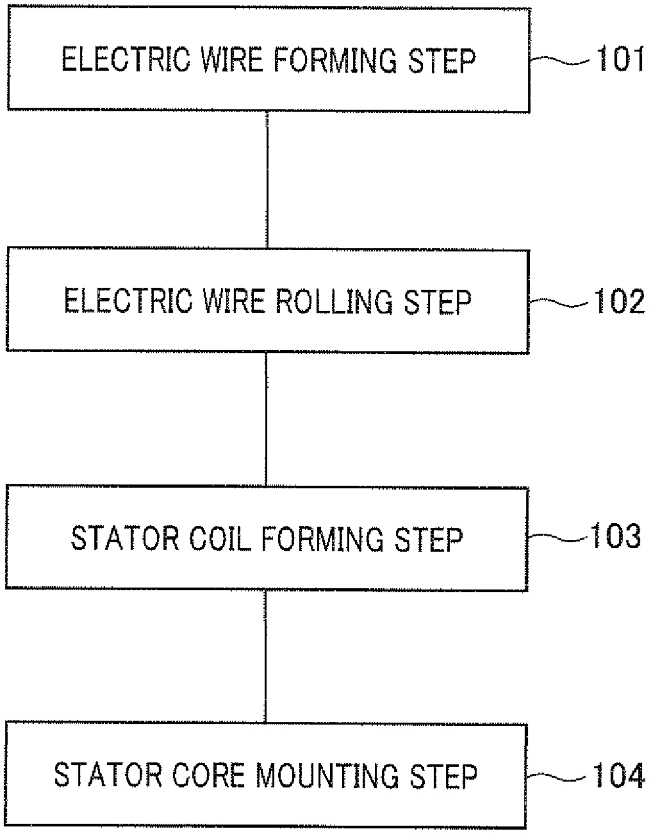
FIG. 19 is a flow chart illustrating a method, according to the embodiment, of manufacturing the stator.

Referring to FIG. 19, in the present embodiment, the method of manufacturing the stator 20 includes an electric wire forming step 101, an electric wire rolling step 102, a stator coil forming step 103, and a stator core mounting step 104.

First, in the electric wire forming step 101, the substantially planar, wave-shaped electric wires 50 as shown in FIGS. 12A-12B are formed by shaping a plurality of (e.g., 48 in the present embodiment) electric wire materials 50*a*.

Figure 20:
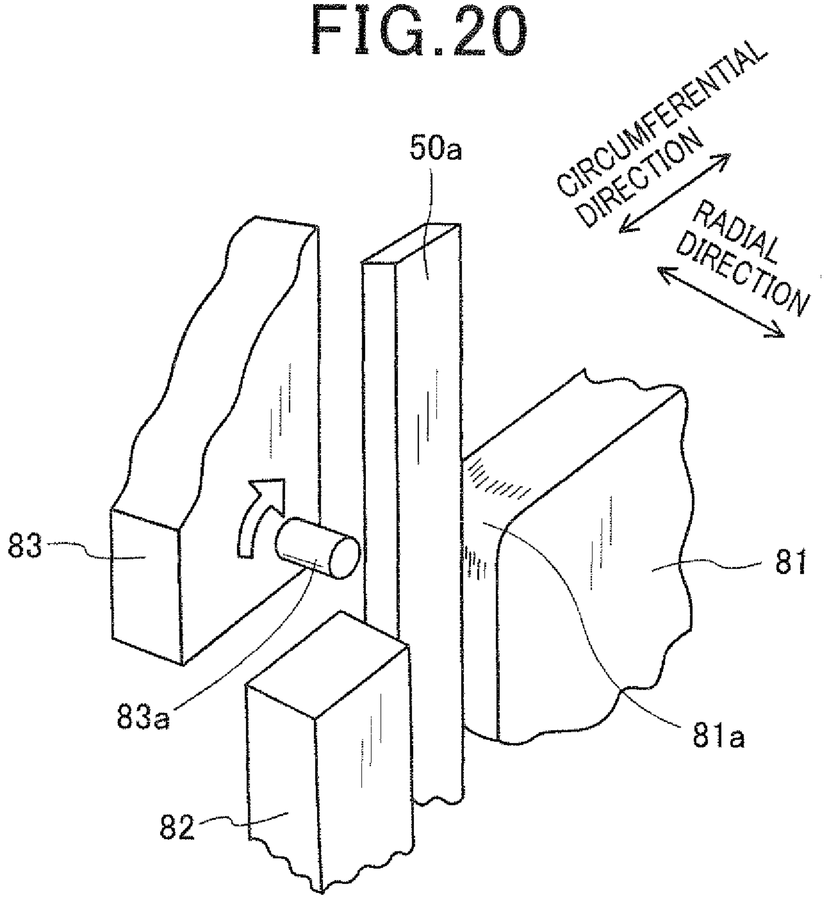
FIG. 20 is a perspective view illustrating an electric wire forming step of the method.
Figure 21A:
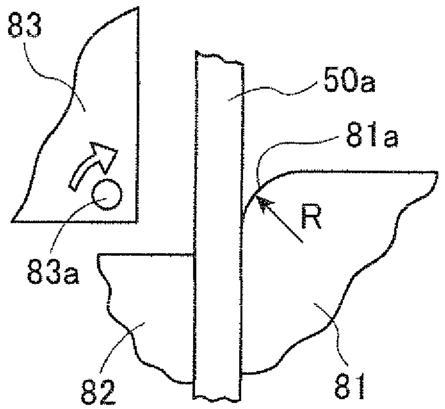
FIGS. 21A and 21B are schematic views respectively illustrating an electric wire material for forming one of the electric wires before and after being bent in the electric wire forming step.
Figure 21B:
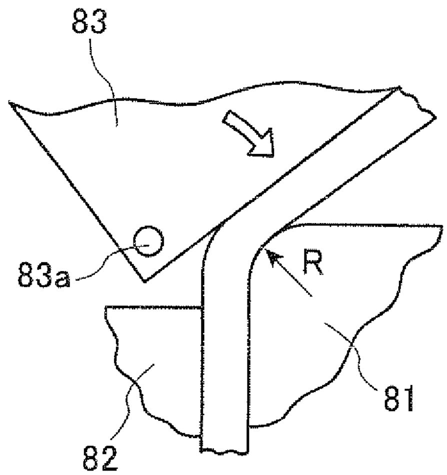

Specifically, referring to FIGS. 20 and 21A-21B, each of the electric wire materials 50*a* is shaped to form one of the electric wires 50 using a pair of first and second fixed jigs 81 and 82 and a rotating jig 83. The first and second fixed jigs 81 and 82 are opposed to each other so as to hold the electric wire material 50*a* therebetween. The rotating jig 83 is rotatably mounted to a supporting shaft 83*a*, so as to bend the electric wire material 50*a* held between the first and second fixed jigs 81 and 82 toward the first fixed jig 81. The first fixed jig 81 has a substantially right-angled corner portion 81*a* which makes contact with, during the bending of the electric wire material 50*a*, the bent portion of the electric wire material 50*a*. In addition, the corner portion 81*a* is rounded with a constant radius of curvature R.

More specifically, in this step, as shown in FIG. 21A, a portion of the electric wire material 50*a* which makes up one of the in-slot portions 51 of the electric wire 50 is first held between the first and second fixed jigs 81 and 82. Then, as shown in FIG. 21B, the rotating jig 83 is rotated about the supporting axis 83*a* toward the first fixed jig 81, thereby pressing the electric wire material 50*a* against the corner portion 81*a* of the first fixed jig 81. Consequently, that portion of the electric wire material 50*a* which adjoins the portion held between the first and second fixed jigs 81 and 82 is bent along the surface of the corner portion 81*a* at a substantially right angle to the portion held between the jigs 81 and 82, thereby forming a shoulder part 55 of the electric wire 50.

Further, in this step, by repeatedly operating the jigs 81-83 in the same manner as described above for other portions of the electric wire material 50*a*, the electric wire 50 is obtained which has the shape as shown in FIGS. 12A-12B.

Furthermore, in this step, by repeatedly operating the jigs 81-83 in the same manner as described above for each of all the electric wire materials 50*a*, the plurality of (e.g., 48 in the present embodiment) electric wires 50 are obtained.

Figure 22:
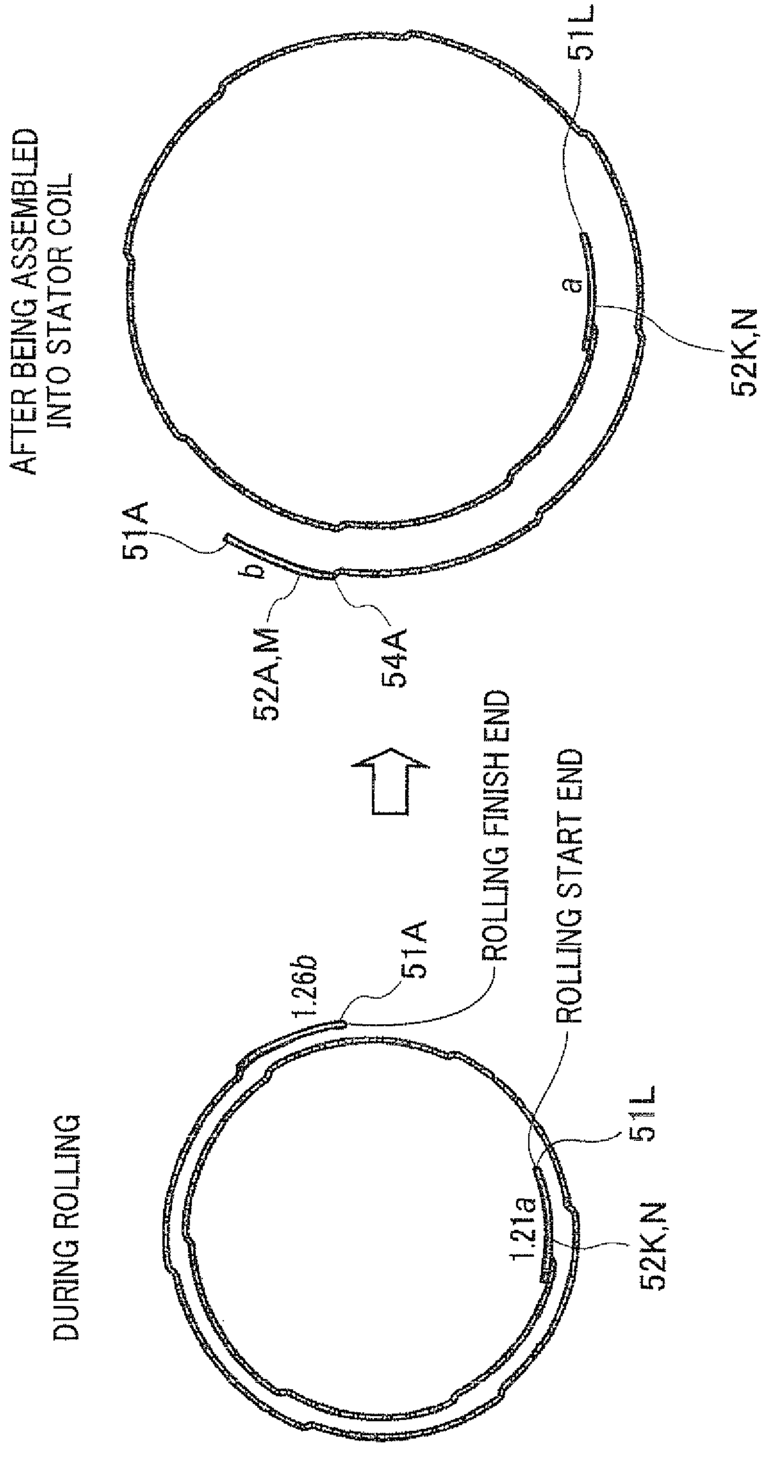
FIG. 22 is a schematic view illustrating one of the electric wires during the rolling of the electric wire in an electric wire rolling step of the method and after being assembled into the stator coil in a stator coil forming step of the method.
Figure 23:
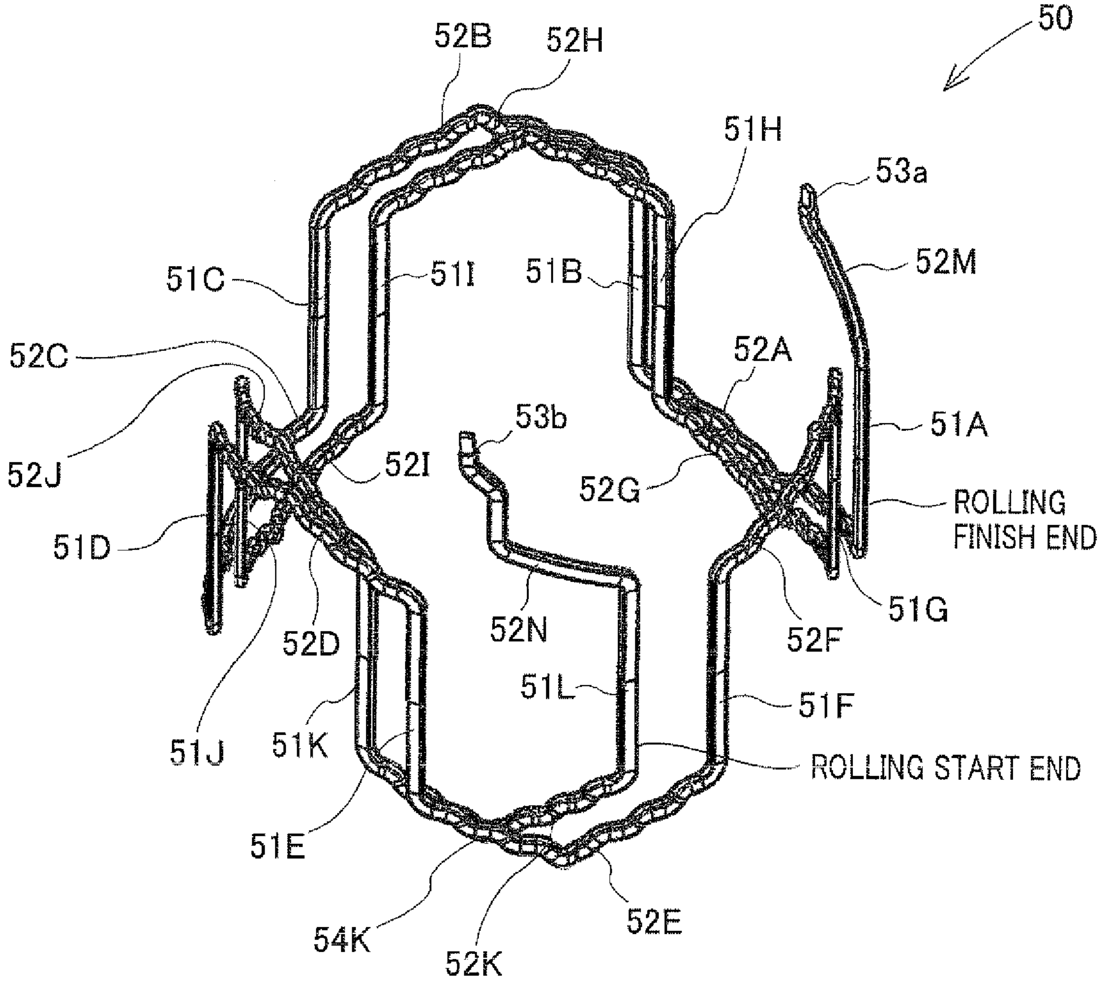
FIG. 23 is a perspective view of one of the electric wires after being rolled in the electric wire rolling step.

In the electric wire rolling step 102, each of the planar electric wires 50 formed in the electric wire forming step 101 is further rolled, through plastic deformation, by a predetermined number of turns (e.g., more than one but less than two turns in the present embodiment) into a spiral shape as shown in FIGS. 22 and 23.

Figure 24:
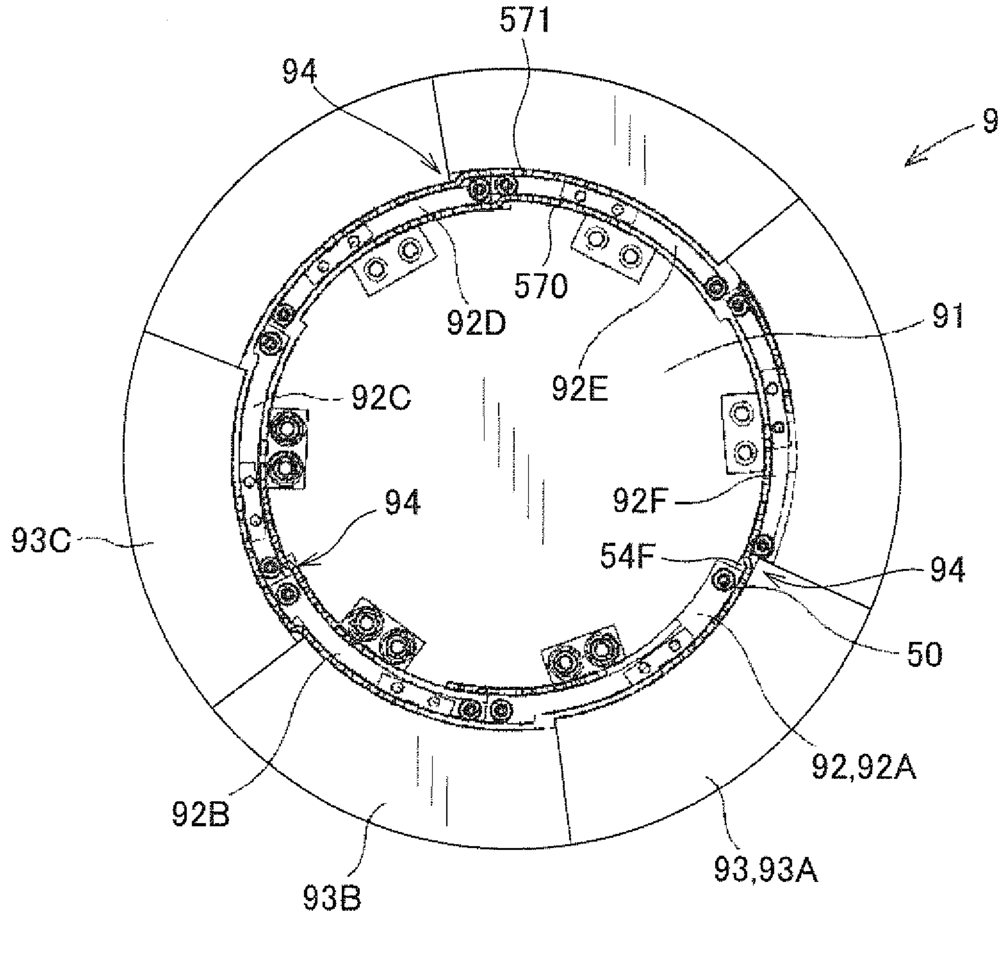
FIG. 24 is an end view illustrating the overall configuration of a rolling apparatus according to the embodiment.

Specifically, in the present embodiment, each of the planar electric wires 50 is rolled using a rolling apparatus 9 as shown in FIG. 24. The rolling apparatus 9 includes a radially inner pressing member 91, a radially intermediate pressing member 92, and a radially outer pressing member 93.

During the rolling of each of the electric wires 50, the inner pressing member 91 makes contact with and presses radially outward the radially inner surface of the first turn (i.e., the radially innermost turn) of the electric wire 50, thereby shaping the radially inner surface of the first turn.

Figure 27:
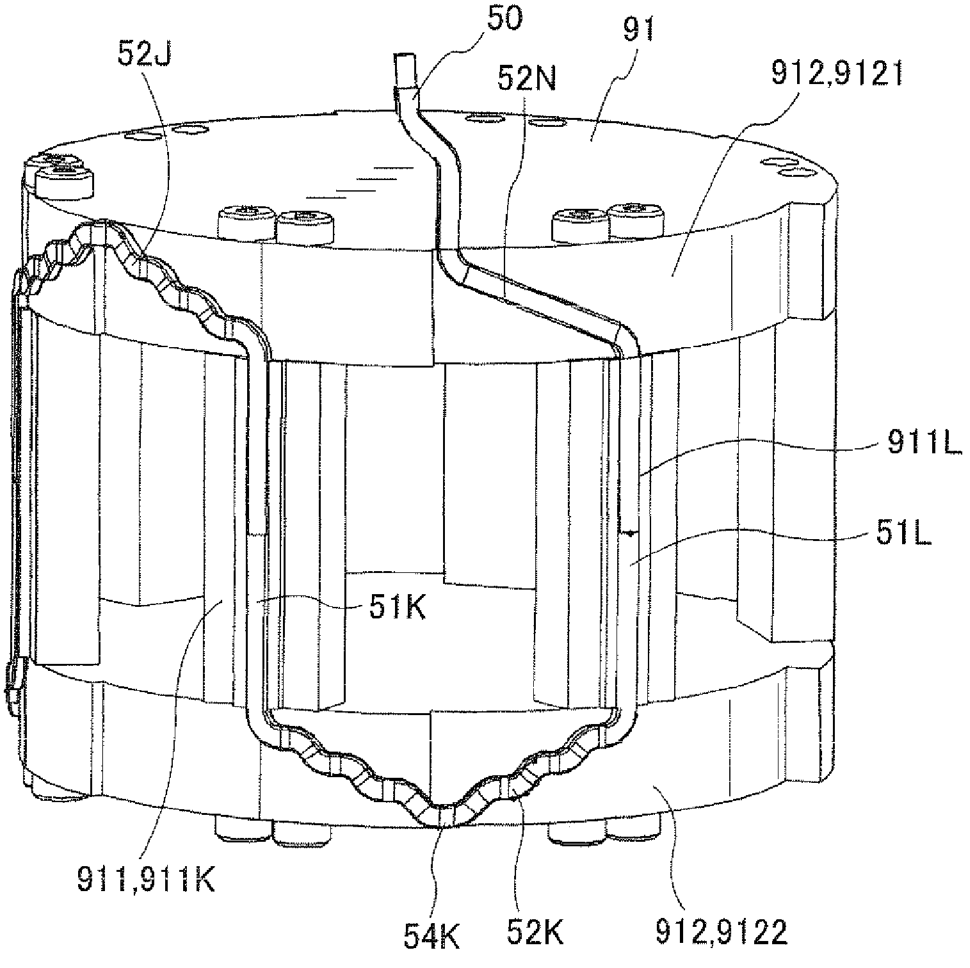
FIG. 27 is a prospective view illustrating the configuration of an inner pressing member of the rolling apparatus.

Referring to FIG. 27, the inner pressing member 91 includes a plurality of restricting portions 911 and a pair of deforming portions 912. Each of the restricting portions 911 receives therein a corresponding one of the in-slot portions 51 in the first turn of the electric wire 50, thereby restricting movement of the corresponding in-slot portion 51. The deforming portions 912 are provided to deform the half-turn portion 52N and turn portions 52 in the first turn of the electric wire 50, thereby shaping them to extend along the radially outer surfaces of the deforming portions 912. The deforming portions 912 include a first deforming portion 9121 for shaping the half-turn portion 52N and turn portions 52 on one axial side of the in-slot portions 51 and a second deforming portion 9122 for shaping the turn portions 52 on the other axial side. The first and second deforming portions 9121 and 9122 have the restricting portions 911 fixed therebetween.

Figure 26:
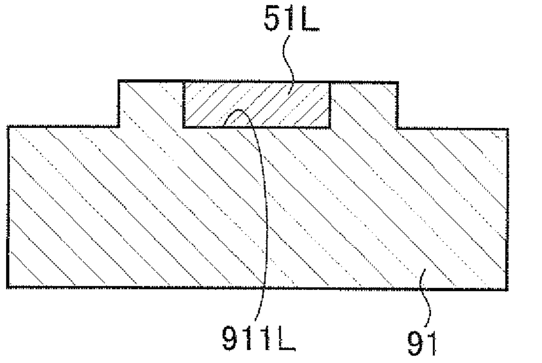
FIG. 26 is a cross-sectional view illustrating the configuration of a restricting portion of the rolling apparatus.

In the present embodiment, each of the restricting portions 911 is formed of a bar having a cross section as shown in FIG. 26. The bar extends parallel to the axial direction of the stator coil 40 and has a recess formed therein. The recess has a cross section that is conformed to the substantially rectangular cross section of the in-slot portions 51 of the electric wire 50. Consequently, the restricting portion 911 can have the corresponding in-slot portion 51 of the electric wire 50 fitted in the recess, thereby restricting movement of the corresponding in-slot portion 51 during the rolling of the electric wire 50.

In addition, it should be noted that in FIGS. 26 and 27, the restricting portions 911 of the inner pressing member 91 are suffixed with the same letters as the corresponding in-slot portions 51 of the electric wire 50.

Each of the deforming portions 9121 and 9122 is formed of a disc having a radially outer surface that is comprised of a plurality of sections having different centers of curvature and different radii of curvature. The deforming portion 9121 makes contact with and presses radially outward the half-turn portion 52N and turn portions 52 on one axial side of the in-slot portions 51 in the first turn of the electric wire 50, thereby deforming them to extend along the radially outer surface of the deforming portion 9121. On the other hand, the deforming portion 9122 makes contact with and presses radially outward the turn portions 52 on the other axial side of the in-slot portions 51 in the first turn of the electric wire 50, thereby deforming them to extend along the radially outer surface of the deforming portion 9122.

In addition, the centers of curvature and radii of curvature of the radially outer surfaces of the deforming portions 9121 and 9122 of the inner pressing member 91 are set based on the desired positions of the half-turn portion 52N and turn portions 52 in the first turn of the electric wire 50 in the finally obtained stator coil 40.

Figure 28:
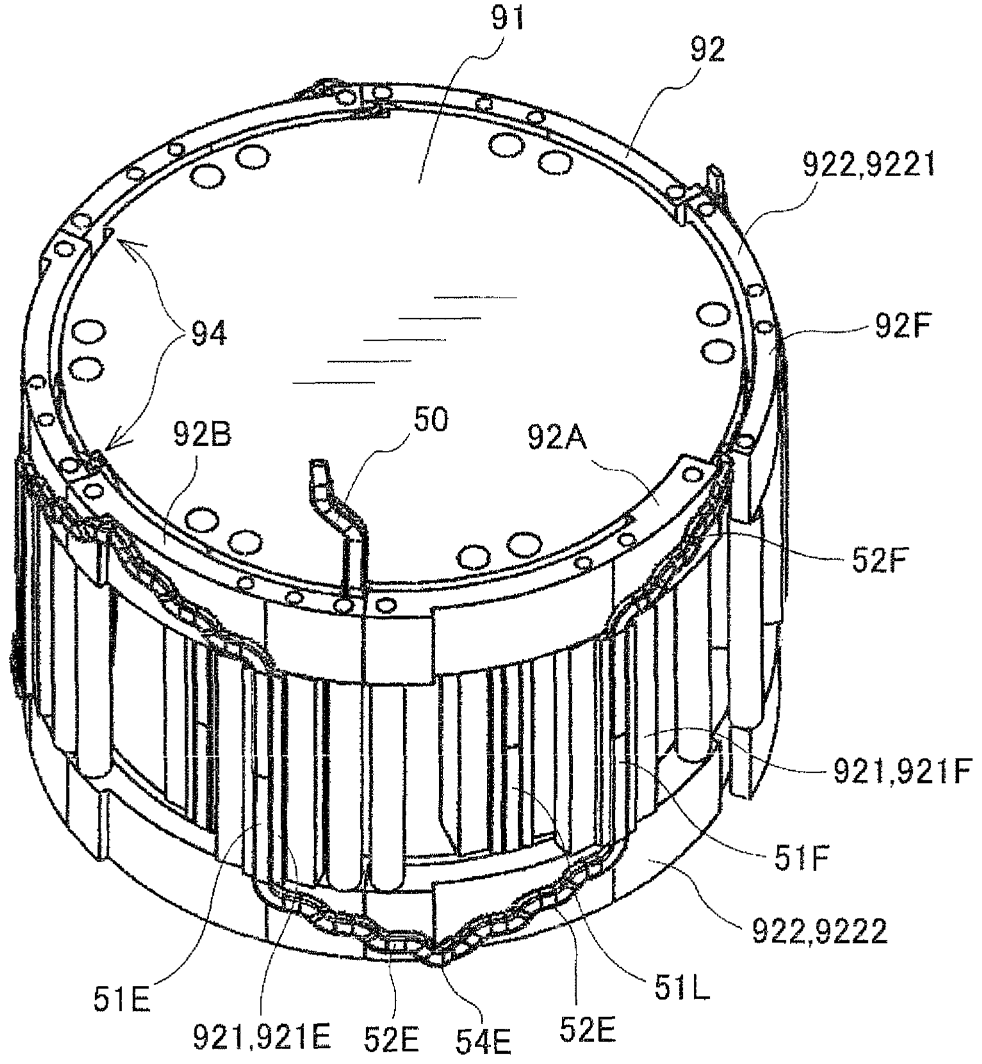
FIG. 28 is a prospective view illustrating the configuration of an intermediate pressing member of the rolling apparatus.

Referring to FIGS. 24 and 28, the intermediate pressing member 92 is arranged so as to have the first turn of the electric wire 50 radially interposed between the inner and intermediate pressing members 91 and 92. The intermediate portion 92 makes contact with and presses radially inward the radially outer surface of the first turn of the electric wire 50, thereby shaping the radially outer surface of the first turn.

In the present embodiment, the intermediate pressing member 92 is composed of, for example, six intermediate pressing member segments 92A-92F that are connected together so as to be pivotable with respect to one another. It should be noted that the intermediate pressing member segments 92A-92F can be mutually-pivotably connected in any suitable manner known in the art.

Each of the intermediate pressing member segments 92A-92F has two arc-shaped end portions and a straight portion that is fixed between the arc-shaped end portions and makes up a restricting portion 921 of the intermediate pressing member 92. The arc-shaped end portions of the intermediate pressing member segments 92A-92F are connected to make up a pair of deforming portions 922 of the intermediate pressing member 92.

The restricting portions 921 of the intermediate pressing member 92 have the same configuration as the restricting portions 911 of the inner pressing member 91. Each of the restricting portions 921 receives therein a corresponding one of the in-slot portions 51 in the remaining less than one turn of the electric wire 50, thereby restricting movement of the corresponding in-slot portion 51. More specifically, each of the restricting portions 921 has the corresponding in-slot portion 51 of the electric wire 50 fitted in the recess thereof, thereby restricting movement of the corresponding in-slot portion 51 during the rolling of the electric wire 50.

In addition, it should be noted that in FIG. 28, the restricting portions 921 of the intermediate pressing member 92 are suffixed with the same letters as the corresponding in-slot portions 51 of the electric wire 50.

The deforming portions 922 of the intermediate pressing member 92 include a first deforming portion 9221 and a second deforming portion 9222. The first deforming portion 9221 is formed by mutually-pivotably connecting the arc-shaped end portions of the intermediate pressing member segments 92A-92F on one axial side of the restricting portions 921. The second deforming portion 9222 is formed by mutually-pivotably connecting the arc-shaped end portions of the intermediate pressing member segments 92A-92F on the other axial side of the restricting portions 921.

Further, each of the first and second deforming portions 9221 and 9222 has a radially inner surface and a radially outer surface; each of the radially inner and outer surfaces is comprised of a plurality of sections having different centers of curvature and different radii of curvature.

The radially inner surface of the first deforming portion 9221 makes contact with the half-turn portion 52N and turn portions 52 on one axial side of the in-slot portions 51 in the first turn of the electric wire 50. During the rolling of the electric wire 50, the first deforming portion 9221 presses the half-turn portion 52N and turn portions 52 radially inward, thereby shaping them in cooperation with the first deforming portion 9121 of the inner pressing member 91.

The radially outer surface of the first deforming portion 9221 makes contact with the half-turn portion 52M and turn portions 52 on the one axial side of the in-slot portions 51 in the remaining less than one turn of the electric wire 50. During the rolling of the electric wire 50, the first deforming portion 9221 presses the half-turn portion 52M and turn portions 52 radially outward, thereby deforming them to extend along the radially outer surface of the first deforming portion 9221.

The radially inner surface of the second deforming portion 9222 makes contact with the turn portions 52 on the other axial side of the in-slot portions 51 in the first turn of the electric wire 50. During the rolling of the electric wire 50, the second deforming portion 9222 presses the turn portions 52 radially inward, thereby shaping them in cooperation with the second deforming portion 9122 of the inner pressing member 91.

The radially outer surface of the second deforming portion 9222 makes contact with the turn portions 52 on the other axial side of the in-slot portions 51 in the remaining less than one turn of the electric wire 50. During the rolling of the electric wire 50, the second deforming portion 9222 presses the turn portions 52 radially outward, thereby deforming them to extend along the radially outer surface of the second deforming portion 9222.

In addition, the centers of curvature and radii of curvature of the radially inner surfaces of the deforming portions 9221 and 9222 of the intermediate pressing member 922 are set based on the desired positions of the half-turn portion 52N and turn portions 52 in the first turn of the electric wire 50 in the finally obtained stator coil 40. On the other hand, the centers of curvature and radii of curvature of the radially outer surfaces of the deforming portions 9221 and 9222 are set based on the desired positions of the half-turn portion 52M and turn portions 52 in the remaining less than one turn of the electric wire 50 in the finally obtained stator coil 40.

Referring to FIGS. 24 and 29-31, the outer pressing member 93 is arranged so as to have the remaining less than one turn of the electric wire 50 radially interposed between the intermediate and outer pressing members 92 and 93. The outer pressing member 93 makes contact with and presses radially inward the radially outer surface of the remaining less than one turn of the electric wire 50, thereby shaping the radially outer surface.

In the present embodiment, the outer pressing member 93 has a hollow cylindrical shape and is composed of, for example, six arc-shaped outer pressing member segments 93A-93F.

The radially outer surfaces of the outer pressing member segments 93A-93F are identical to each other. In other words, the outer pressing member 93 has a uniform radially outer surface. However, the radially inner surfaces of the outer pressing member segments 93A-93F have different centers of curvature and different radii of curvature. In other words, the outer pressing member 93 has a radially inner surface that is comprised of a plurality of sections having different centers of curvature and different radii of curvature.

The radially inner surface of the outer pressing member 93 makes contact with the half-turn portion 52M and turn portions 52 in the remaining less than one turn of the electric wire 50. During the rolling of the electric wire 50, the outer pressing member 93 presses the half-turn portion 52M and turn portions 52 radially inward, thereby shaping them in cooperation with the deforming portions 922 of the intermediate pressing member 92.

In addition, the centers of curvature and radii of curvature of the radially inner surfaces of the outer pressing member segments 93A-93F are set based on the desired positions of the half-turn portion 52M and turn portions 52 in the remaining less than one turn of the electric wire 50 in the finally obtained stator coil 40.

Figure 29:
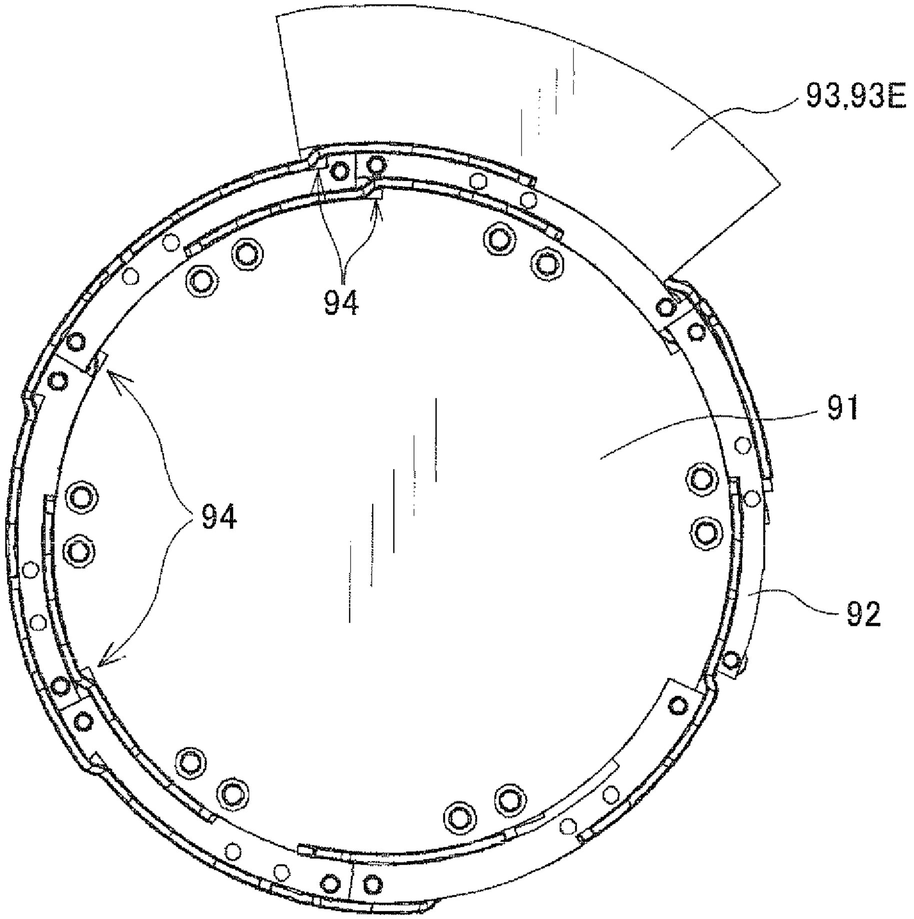
FIG. 29 is an end view illustrating an outer pressing member segment of the rolling apparatus which presses one of the electric wires radially inward against the intermediate pressing member.
Figure 30:
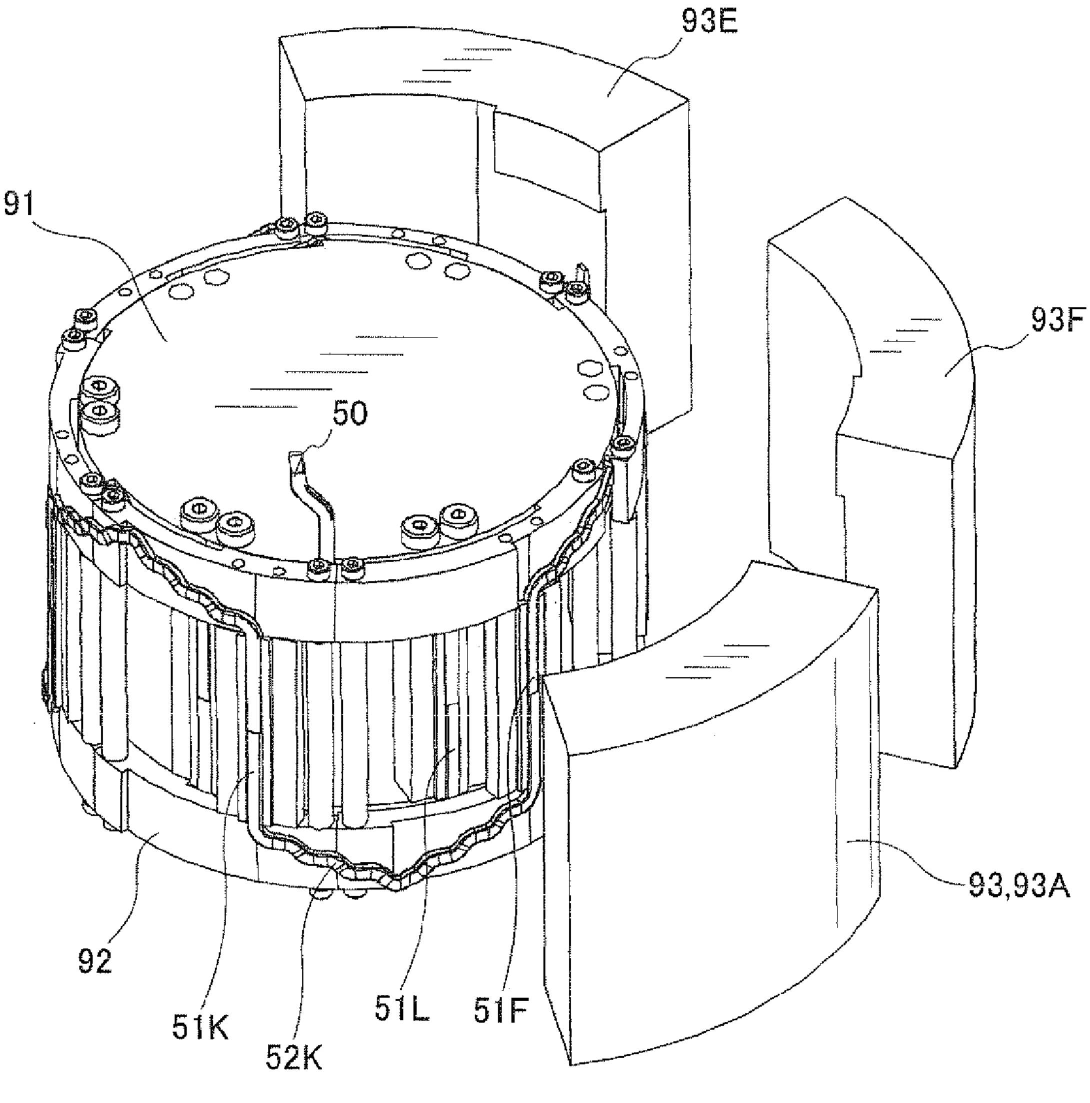
FIG. 30 is a prospective view illustrating a plurality of outer pressing member segments of the rolling apparatus which are placed radially outside the intermediate pressing member.

Referring to FIGS. 24 and 28-29, in the present embodiment, each of those pressing surfaces of the inner, intermediate, and outer pressing members 91-93 which press the electric wire 50 has a plurality of restricting portions 94 formed therein. Here, the pressing surfaces of the inner, intermediate, and outer pressing members 91-93 include the radially outer surfaces of the deforming portions 9121 and 9122 of the inner pressing member 91, the radially inner and outer surfaces of the deforming portions 9221 and 9222 of the intermediate pressing member 92, and the radially inner surface of the outer pressing member 93. Each of the restricting portions 94 is shaped (more specifically, stepped in the present embodiment) so as to restrict circumferential movement of a corresponding one of the crank-shaped parts 54 of the turn portions 52 of the electric wire 50 during the rolling of the electric wire 50. In addition, in the present embodiment, the restricting portions 94 are provided at the boundaries between circumferentially-adjacent pairs of the sections of the radially outer surfaces of the deforming portions 9121 and 9122 of the inner pressing member 91, the boundaries between circumferentially-adjacent pairs of the intermediate pressing member segments 92A-92F, and the boundaries between circumferentially-adjacent pairs of the outer pressing member segments 93A-93F.

Moreover, in the present embodiment, to bend each of the turn portions 52A-52K and half-turn portions 52M and 52N of the electric wire 50 to have predetermined curvatures, each of the pressing surfaces of the inner, intermediate, and outer pressing members 91-93 is comprised of the plurality of sections having the different centers of curvature and different radii of curvature. Consequently, after the rolling of the electric wire 50, each of the turn portions 52A-52K of the electric wire 50 has two different curvatures respectively on opposite sides of the crank-shaped part 54 thereof.

Specifically, for each of the turn portions 52A-52K of the electric wire 50, the radial positions of the two in-slot portions 51 which are connected by the turn portion are different from each other. Therefore, the curvature of that section of the turn portion which circumferentially extends between the crank-shaped part 54 of the turn portion and one of the two in-slot portions 51 is different from the curvature of that section of the turn portion which circumferentially extends between the crank-shaped part 54 and the other in-slot portion 51.

Figures 25A, 25B:
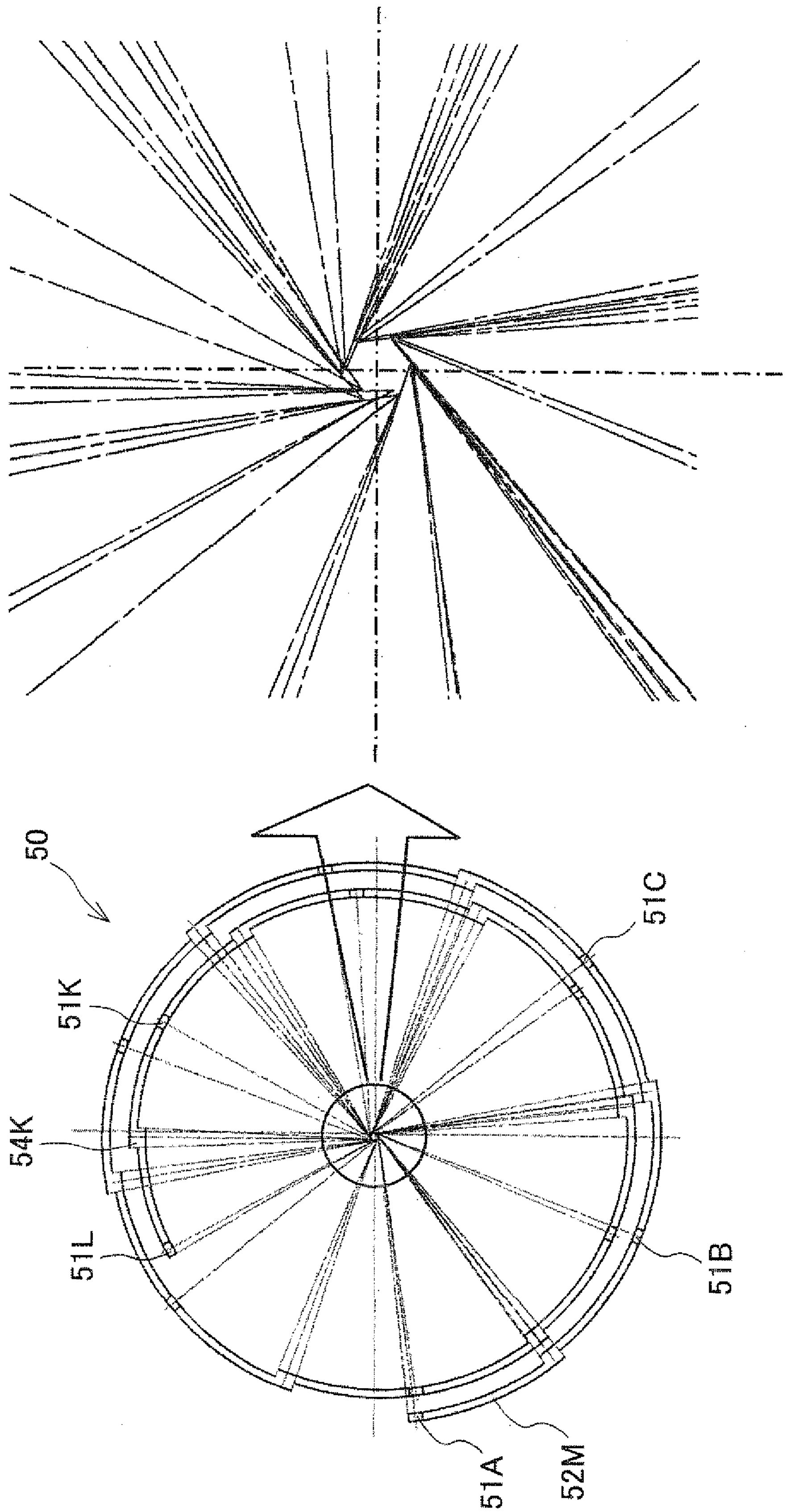
FIG. 25A is a schematic view illustrating the centers of curvature of all the circumferentially-extending sections of the turn portions and half-turn portions of one of the electric wires when the electric wire is pressed by pressing members of the rolling apparatus.
FIG. 25B is an enlarged view of the circled part of FIG. 25A.

For example, referring to FIGS. 25A and 27, the turn portion 52K, which has the crank-shaped part 54K formed therein, connects the in-slot portions 51K and 51L. The difference in radial position between the in-slot portions 51*k* and 51L is equal to the radial thickness of the in-slot portions. Therefore, the curvature of that section of the turn portion 52K which circumferentially extends between the crank-shaped part 54K and the in-slot portion 51K is different from the curvature of that section of the turn portion 52K which circumferentially extends between the crank-shaped part 54K and the in-slot portion 51L.

FIGS. 25A-25B illustrates the centers of curvature of all the circumferentially-extending sections of the turn portions 52A-52K and half-turn portions 52M and 52N of the electric wire 50 when the electric wire 50 is being pressed by all the pressing members 91-93 of the rolling apparatus 9 as shown in FIG. 24.

It can be seen from FIGS. 25A-25B that when the electric wire 50 is being pressed by all the pressing members 91-93 of the rolling apparatus 9, the centers of curvature of all the circumferentially-extending sections of the turn portions 52A-52K and half-turn portions 52M and 52N of the electric wire 50 together form a substantially regular hexagonal shape.

Further, in the present embodiment, the curvature ratios of the circumferentially-extending sections of the turn portions 52A-52K and half-turn portions 52M and 52N of the electric wire 50 increase with the radial positions of the same. Here, the curvature ratio of a circumferentially-extending section of the electric wire 50 represents the ratio of the curvature of the section during the rolling of the electric wire 50 to the curvature of the section in the finally obtained stator coil 40 (i.e., after the electric wire 50 is assembled into the stator coil 40).

For example, among all the turn portions 52A-52K and half-turn portions 52M and 52N of the electric wire 50, the in-slot portion 51L-side half of the turn portion 52K and the half-turn portion 52N are positioned most radially inward, whereas the in-slot portion 51A-side half of the turn portion 52A and the half-turn portion 52M are positioned most radially outward. Therefore, the curvature ratio of the in-slot portion 51A-side half of the turn portion 52A and the half-turn portion 52M is greater than the curvature ratio of the in-slot portion 51L-side half of the turn portion 52K and the half-turn portion 52N.

More specifically, referring to FIG. 22, let the curvature of the in-slot portion 51L-side half of the turn portion 52K and the half-turn portion 52N in the finally obtained stator coil 40 (i.e., after the electric wire 50 is assembled into the stator coil 40) be a, then the curvature during the rolling of the electric wire 50 is 1.21a. Accordingly, the curvature ratio of the in-slot portion 51L-side half of the turn portion 52K and the half-turn portion 52N is equal to 1.21. On the other hand, let the curvature of the in-slot portion 51A-side half of the turn portion 52A and the half-turn portion 52M in the finally obtained stator coil 40 be b, then the curvature during the rolling of the electric wire 50 is 1.26b. Accordingly, the curvature ratio of the in-slot portion 51A-side half of the turn portion 52A and the half-turn portion 52M is equal to 1.26.

In addition, the curvature ratios of the circumferentially-extending sections of the turn portions 52A-52K and half-turn portions 52M and 52N of the electric wire 50 can be set according to the material of the electric wires 50 and the dimensions of the stator coil 40. For example, the curvature ratio of the in-slot portion 51L-side half of the turn portion 52K and the half-turn portion 52N may be set in the range of 1.20 to 1.22, whereas that of the in-slot portion 51A-side half of the turn portion 52A and the half-turn portion 52M may be set in the range of 1.25 to 1.27.

In the electric wire rolling step 102, each of the electric wires 50 is rolled using the above-described rolling apparatus 9 in the following manner.

First, the in-slot portion 51L of the electric wire 50, which is to be located most radially inward among the in-slot portions 51A-51L of the electric wire 50 in the finally obtained stator 20, is fitted into the recess formed in the restricting portion 911L of the inner pressing member 91, as shown in FIGS. 26-27. Consequently, both the circumferential movement and radially inward movement of the in-slot portion 51L are restricted by the restricting portion 911L. In addition, the restricting portion 911L also prevents the in-slot portion 51L from being twisted.

Then, referring to FIGS. 27 and 28, the intermediate pressing member segment 92A is placed radially outside the in-slot portion 51L-side half of the turn portion 52K and the half-turn portion 52N of the electric wire 50 and pressed by a press device (not shown) radially inward. Consequently, the half-turn portion 52N is pressed between the deforming portion 9121 of the inner pressing member 91 and the deforming portion 9221 of the intermediate pressing member segment 92A, thereby being deformed to extend along the radially outer surface of the deforming portion 9121. On the other hand, the in-slot portion 51L-side half of the turn portion 52K is pressed between the deforming portion 9122 of the inner pressing member 91 and the deforming portion 9222 of the intermediate pressing member segment 92A, thereby being deformed to extend along the radially outer surface of the deforming portion 9122.

Moreover, during the deformation of the in-slot portion 51L-side half of the turn portion 52K and the half-turn portion 52N, the intermediate pressing member segment 92A also restricts the radially outward movement of the in-slot portion 51L of the electric wire 50. In addition, as described previously, both the circumferential movement and radially inward movement of the in-slot portion 51L are restricted by the restricting portion 911L of the inner pressing member 91. Consequently, both the circumferential and radial positions of the in-slot portion 51L are restricted by the inner and intermediate pressing members 91 and 92 during the rolling of the electric wire 50.

Further, the intermediate pressing member segment 92B is placed radially outside the in-slot portion 51K-side half of the turn portion 52K and the in-slot portion 51K-side half of the turn portion 52J of the electric wire 50 and pressed by the press device radially inward. Consequently, the in-slot portion 51K-side half of the turn portion 52K is pressed between the deforming portion 9122 of the inner pressing member 91 and the deforming portion 9222 of the intermediate pressing member segment 92B, thereby being deformed to extend along the radially outer surface of the deforming portion 9122. On the other hand, the in-slot portion 51K-side half of the turn portion 52J is pressed between the deforming portion 9121 of the inner pressing member 91 and the deforming portion 9221 of the intermediate pressing member segment 928, thereby being deformed to extend along the radially outer surface of the deforming portion 9121.

Moreover, the radially inner surface of the intermediate pressing member segment 92B is offset radially outward from the radially inner surface of the intermediate pressing member segment 92A, forming one of the restricting portions 94 between the two radially inner surfaces. The formed restricting portion 94 restricts the circumferential movement of the crank-shaped part 54K of the turn portion 52K during the deformation of the in-slot portion 51K-side half of the turn portion 52K and the in-slot portion 51K-side half of the turn portion 52J.

Furthermore, with the deformation of the in-slot portion 51K-side half of the turn portion 52K and the in-slot portion 51K-side half of the turn portion 52J, the in-slot portion 51K of the electric wire 50 is fitted into the recess formed in the restricting portion 911K of the inner pressing member 91. Consequently, both the circumferential movement and radially inward movement of the in-slot portion 51K are restricted by the restricting portion 911K of the inner pressing member 91; the radially outward movement of the in-slot portion 51K is restricted by the intermediate pressing member segment 92B. As a result, both the circumferential and radial positions of the in-slot portion 51K are restricted by the inner and intermediate pressing members 91 and 92 during the rolling of the electric wire 50.

In addition, during the deformation of the in-slot portion 51K-side half of the turn portion 52K and the in-slot portion 51K-side half of the turn portion 52J, the in-slot portion 51L-side half of the turn portion 52K is kept pressed between the deforming portion 9122 of the inner pressing member 91 and the deforming portion 9222 of the intermediate pressing member segment 92A. Consequently, the in-slot portion 51K of the electric wire 50 can be easily fitted into the recess formed in the restricting portion 911K of the inner pressing member 91.

By repeating the above process using the intermediate pressing member segments 92C-92F, the first turn of the electric wire 50 is completed which is rolled around the inner pressing member 91, as shown FIG. 28. Consequently, the in-slot portions 51L-510 in the first turn of the electric wire 50 are sequentially and respectively fitted into the recesses of the restricting portions 911L-911G of the inner pressing member 91; the half-turn portion 52N, the turn portions 52K-52G, and the in-slot portion 51G-side half of the turn portion 52F in the first turn of the electric wire 50 are sequentially deformed to extend along the corresponding radially outer surfaces of the deforming portions 9121 and 9122 of the inner pressing member 91.

Further, referring to FIGS. 28-31, with the intermediate pressing member segments 92A-92F disposed to surround the inner pressing member 91, the outer pressing member segment 93A is placed radially outside the in-slot portion 51F-side half of the turn portion 52F and the in-slot portion 51F-side half of the turn portion 52E of the electric wire 50 and pressed by the press device radially inward. Consequently, the in-slot portion 51F-side half of the turn portion 52F is pressed between the deforming portion 9221 of the intermediate pressing member segment 92A and the outer pressing member segment 93A, thereby being deformed to extend along the radially outer surface of the deforming portion 9221. On the other hand, the in-slot portion 51F-side half of the turn portion 52E is pressed between the deforming portion 9222 of the intermediate pressing member segment 92A and the outer pressing member segment 93A, thereby being deformed to extend along the radially outer surface of the deforming portion 9222.

Moreover, referring to FIG. 24, the radially inner surface of the outer pressing member segment 93A is offset radially outward from the radially inner surface of the intermediate pressing member segment 92F, forming one of the restricting portions 94 between the two radially inner surfaces. The formed restricting portion 94 restricts the circumferential movement of the crank-shaped part 54F of the turn portion 52F during the deformation of the in-slot portion 51F-side half of the turn portion 52F and the in-slot portion 51F-side half of the turn portion 52E.

Furthermore, with the deformation of the in-slot portion 51F-side half of the turn portion 52F and the in-slot portion 51F-side half of the turn portion 52E, the in-slot portion 51F is fitted into the recess formed in the restricting portion 921F of the intermediate pressing member segment 92A. Consequently, both the circumferential movement and radially inward movement of the in-slot portion 51F are restricted by the restricting portion 921F of the intermediate pressing member segment 92A; the radially outward movement of the in-slot portion 51F is restricted by the outer pressing member segment 93A. As a result, both the circumferential and radial positions of the in-slot portion 51F are restricted by the intermediate pressing member segment 92A and the outer pressing member segment 93A.

In addition, during the deformation of the in-slot portion 51F-side half of the turn portion 52F and the in-slot portion 51F-side half of the turn portion 52E, the in-slot portion 51G-side half of the turn portion 52F is kept pressed between the inner pressing member 91 and the intermediate pressing member segment 92F. Consequently, the in-slot portion 51F can be easily fitted into the recess formed in the restricting portion 921F of the intermediate pressing member segment 92A.

Figure 31:
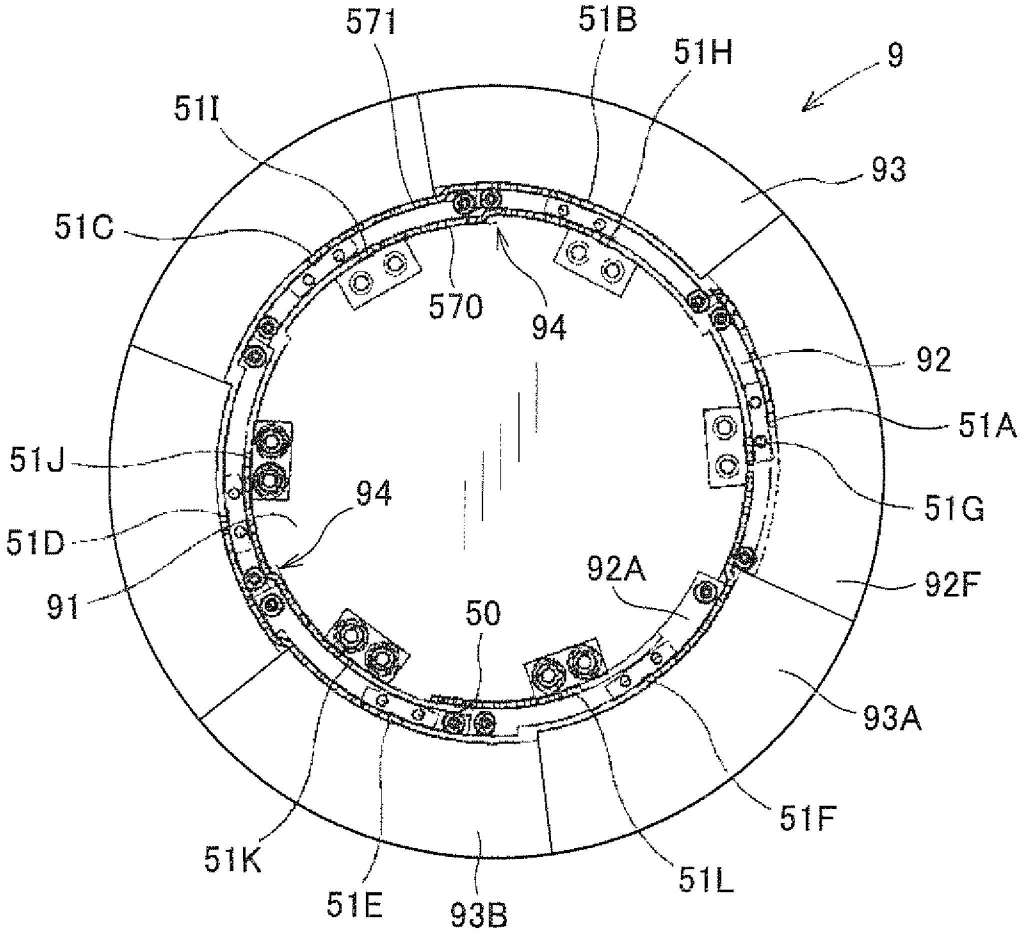
FIG. 31 is an end view illustrating the configuration of an outer pressing member of the rolling apparatus.

By repeating the above process using the outer pressing member segments 93B-93F, the remaining less than one turn of the electric wire 50 is completed which is rolled around the intermediate pressing member 92, as shown in FIG. 31. Consequently, the in-slot portions 51F-51A in the remaining less than one turn of the electric wire 50 are sequentially and respectively fitted into the recesses of the restricting portions 921F-921A of the intermediate pressing member 92; the in-slot portion 51F-side half of the turn portion 52F, the turn portions 52E-52A, and the half-turn portion 52M in the remaining less than one turn of the electric wire 50 are sequentially deformed to extend along the corresponding radially outer surfaces of the deforming portions 9221 and 9222 of the intermediate pressing member 92.

In addition, as shown in FIG. 31, the rolled electric wire 50 includes a radially inner part 570 (i.e., the first turn portion) and a radially outer part 571 (i.e., the remaining less one turn) that overlap each other in the radial direction; the radially inner part 570 includes the half-turn portion 52N and the turn portions 52K-52G; the radially outer part 571 includes the turn portions 52F-52A and the half-turn portion 52M.

After the rolling of the electric wire 50 is completed, all of the inner, intermediate, and outer pressing members 91-93 are removed from the electric wire 50, obtaining the spiral shape of the electric wire 50 as shown in FIG. 22.

In the subsequent stator coil forming step 103, the rolled electric wires 50 are assembled together, through operations of creating relative axial movement therebetween, to form the stator coil 40.

Figure 32A:
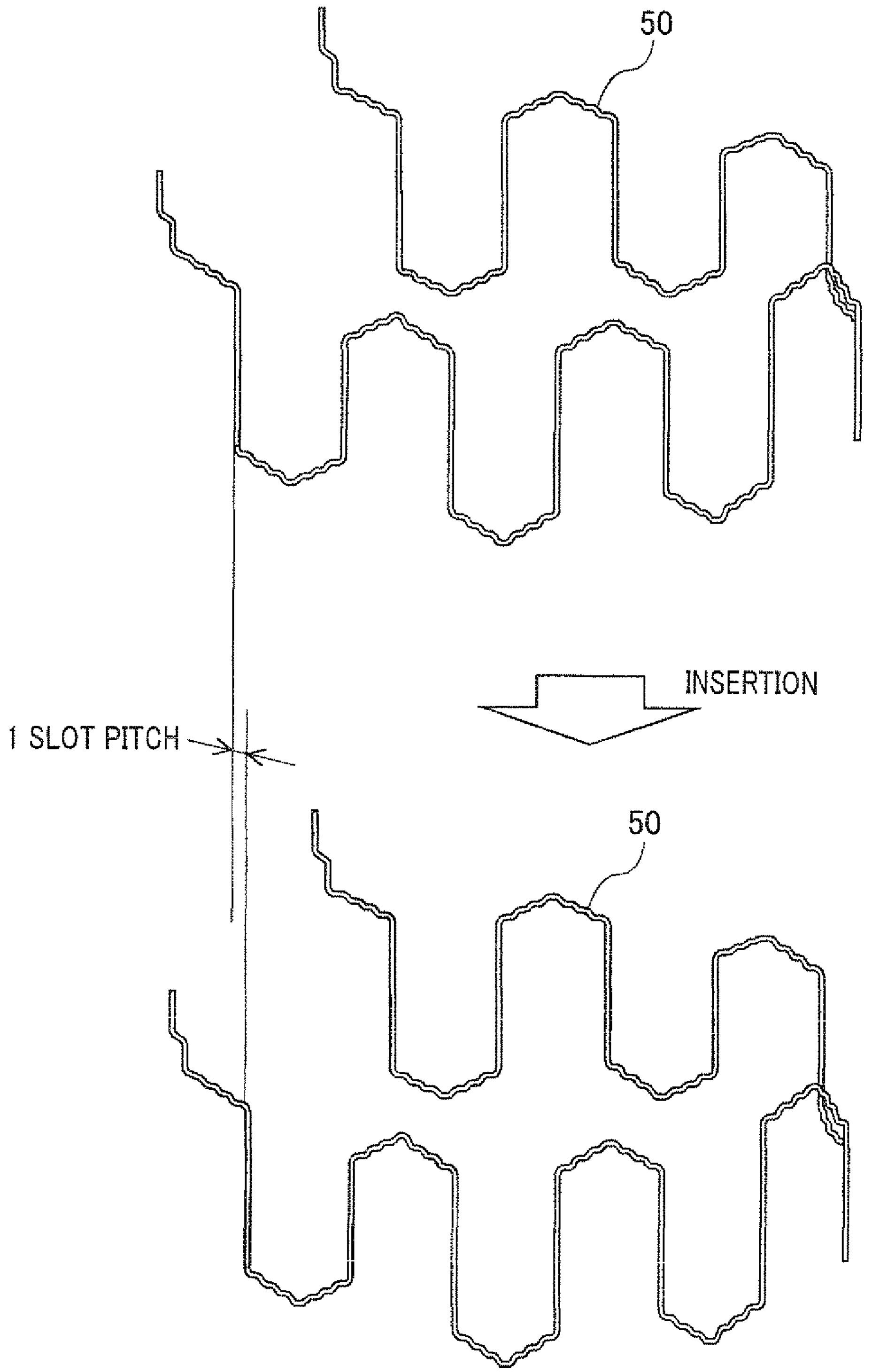
FIG. 32A is a schematic view illustrating the operation of axially moving one of the rolled electric wires toward another one of the same in the stator coil forming step of the method.

Specifically, in this step, as shown in FIG. 32A, a pair of the electric wires 50 are assembled together by: (1) placing them so that they are offset from each other in the circumferential direction (i.e., the horizontal direction in FIG. 32A) by one slot pitch of the stator core 30; and (2) axially (i.e., in the vertical direction in FIG. 32A) moving one of them (i.e., the upper one in FIG. 32A) toward the other (i.e., the lower one in FIG. 32A).

Figure 32B:
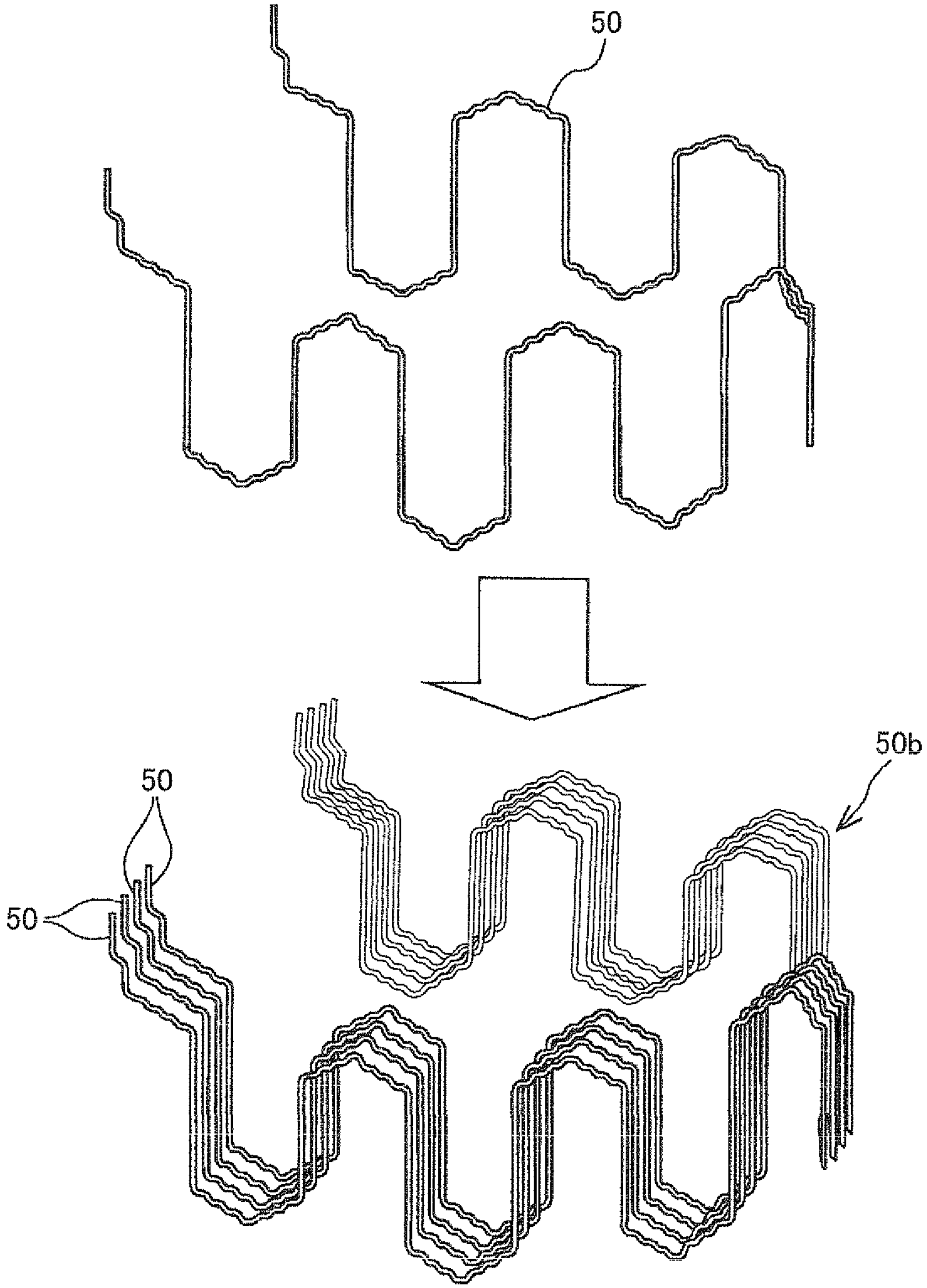
FIG. 32B is a schematic view illustrating the operation of axially moving one of the rolled electric wires toward an electric wire assembly, which is comprised of plural of the rolled electric wires, in the stator coil forming step.
Figure 33:
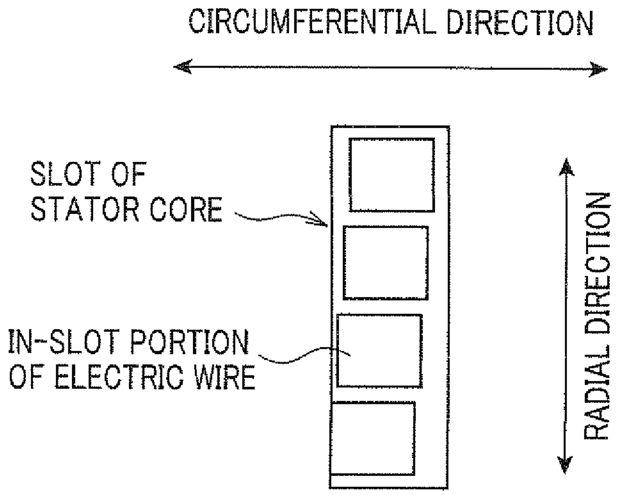
FIG. 33 is a schematic view illustrating one problem in the prior art.
Figure 34:
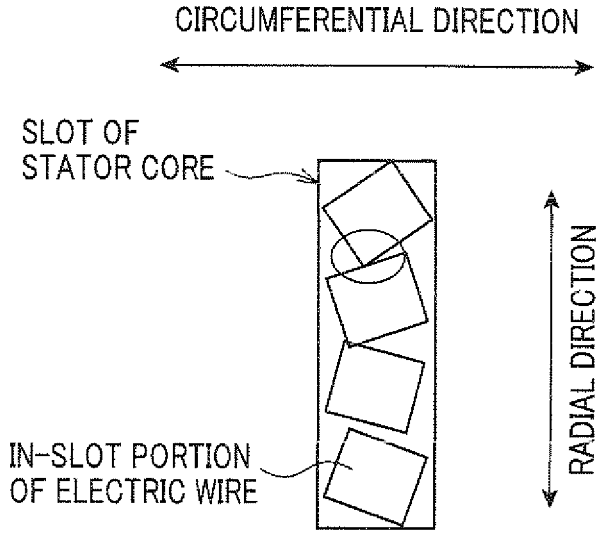
FIG. 34 is a schematic view illustrating another problem in the prior art.

Further, by repeating the above placing and moving operations, an electric wire assembly 50*b* is obtained which includes a plurality of (e.g., 4 in FIG. 32B) the electric wires 50. Furthermore, by repeating the above placing and moving operations, as shown in FIG. 32B, an electric wire 50 is further assembled to the electric wire assembly 50*b*, thereby forming a larger electric wire assembly 50*b*.

In the present embodiment, the stator coil 40 is formed by assembling the electric wires 50 one by one. More specifically, the stator coil 40 is formed by each time assembling only one electric wire 50 to another electric wire 50 in the same manner as illustrated in FIG. 32A or to an electric wire assembly 50*b* in the same manner as illustrated in FIG. 32B.

It should be noted that the stator coil 40 can also be formed by first forming a plurality of electric wire assemblies 50*b* and then assembling the electric wire assemblies 50*b* together. In addition, it also should be noted that for the sake of simplicity, the electric wires 50, which are rolled by more than one turn in the present embodiment, are depicted in FIGS. 32A-32B as being rolled only by less than one turn.

Furthermore, in the present embodiment, in assembling the electric wires 50, the electric wires 50 or the electric wire assemblies 50*b* are elastically deformed in the radial direction, so as to minimize interference between the electric wires

50 and the electric wire assemblies 50*b* and thereby facilitate relative axial movement therebetween.

After assembling all of the electric wires 50 together as described above, the corresponding pairs of the lead portions 53*a* and 53*b* of the electric wires 50 are joined together by, for example, welding. As a result, the stator coil 40 as shown in FIGS. 7-10 is obtained.

In the stator core mounting step 104, the stator core 30 is mounted to the stator coil 40 formed in the stator coil forming step 103.

Specifically, in this step, the tooth portions 33 of the stator core segments 32 are respectively inserted into the spaces formed between the stacks of the in-slot portions 51 of the electric wires 50 from the radially outside of the stator coil 40. Then, the outer rim 37 is fitted onto the radially outer surfaces of the stator core segments 32. As a result, the stator core 30 and the stator coil 40 are assembled together, forming the stator 20 as shown in FIGS. 2-4.

According to the present embodiment, it is possible to achieve the following advantages.

In the present embodiment, the stator coil 40 is manufactured by a method which includes the electric wire forming step 101, the electric wire rolling step 102, and the stator coil forming step 103. In the electric wire forming step 101, the substantially planar, wave-shaped electric wires 50 as shown in FIGS. 12A-12B are formed by shaping the electric wire materials 50*a*. Each of the planar electric wires 50 includes the in-slot portions 51 and the turn portions 52. Each of the in-slot portions 51 is to be received in a corresponding one of the slots 31 of the stator core 30. Each of the turn portions 52 connects an adjacent pair of the in-slot portions 51 and is to be located outside the slots 31 of the stator core 30. In the electric wire rolling step 102, each of the planar electric wires 50 is rolled, through plastic deformation, into the spiral shape as shown in FIG. 22. In the stator coil forming step 103, the rolled electric wires 50 are assembled together, through operations of creating relative axial movement therebetween, to form the stator coil 40 as shown in FIGS. 7-10. Further, in the present embodiment, in the electric wire rolling step 102, each of the planar electric wires 50 is rolled by deforming each of the turn portions 52 of the electric wire 50 while restricting movement of the at least one of the in-slot portions 51 of the electric wire 50 which is located closer to the rolling start end of the electric wire 50 than the turn portion 52 is.

With the above method, it is possible to ensure the positional accuracy of the in-slot portions 51 in each of the rolled electric wires 50; it is also possible to prevent each of the in-slot portions 51 from being twisted during the rolling of the electric wire 50.

Consequently, in the stator coil forming step 103, it is possible to accurately align those in-slot portions 51 of the electric wires 50 which are to be received in the same slot 31 of the stator core 30 in a radial direction of the stator coil 40; it is also possible to arrange those in-slot portions 51 of the electric wires 50 parallel to and in abutment with each other without damaging the insulating coats 68 of those in-slot portions 51.

As a result, it is possible to easily and accurately assemble the stator coil 40 with the stator core 30 in the stator core mounting step 104; it is also possible to ensure high space factors of the in-slot portions 51 of the electric wires 50 in the slots 31 of the stator core 30 as well as high insulation properties of the stator 20.

In the present embodiment, each of the in-slot portions 51 of the electric wires 50 has the substantially rectangular cross section. On the other hand, each of the restricting portions 911 of the inner pressing member 91 and the restricting portions 921 of the intermediate pressing member 92 has formed therein the recess which has the cross section conformed to the substantially rectangular cross section of the in-slot portions 51, as shown in FIG. 26. During the rolling of each of the electric wires 50, the in-slot portions 51 of the electric wire 50 are sequentially and respectively fitted into the recesses of the restricting portions 911 of the inner pressing member 91 and the restricting portions 921 of the intermediate pressing member 92.

Consequently, it is possible to reliably restrict both the circumferential movement and radially inward movement of each of the in-slot portions 51; it is also possible to reliably prevent each of the in-slot portions 51 from being twisted.

In the present embodiment, for each of the planar electric wires 50 formed in the electric wire forming step 101, each of the turn portions 52, which connects an adjacent pair of the in-slot portions 51, protrudes from the adjacent pair of the in-slot portions 51 in the extending direction of the in-slot portions 51, as shown in FIGS. 12A-12B.

With the above shape of the turn portions 52, when the turn portions 52 are pressed and thereby deformed in the electric wire rolling step 102, it is generally easy for the in-slot portions 51 to be moved and/or twisted due to their connection with the turn portions 52. However, in the present embodiment, with the restricting portions 911 and 921 of the inner and intermediate pressing members 91 and 92 restricting movement of the in-slot portions 51 during the rolling of the electric wire 50, it is possible to ensure the positional accuracy of the in-slot portions 51 in the rolled electric wire 50.

In the present embodiment, in the electric wire rolling step 102, each of the planar electric wires 50 is rolled by deforming each of the turn portions 52 of the electric wire 50 to extend along a corresponding one of the radially outer surfaces of the deforming portions 9121, 9122, 9221, and 9222 of the inner and intermediate pressing members 91 and 92. Each of the radially outer surfaces of the deforming portions 9121, 9122, 9221, and 9222 is comprised of the plurality of arc-shaped sections having the different centers of curvature and different radii of curvature.

Consequently, it is possible to reliably locate the turn portions 52 of each of the electric wires 50 in the desired positions thereof in the finally obtained stator 20, as shown in FIGS. 15 and 16.

In the present embodiment, for each of the planar electric wires 50 formed in the electric wire forming step 101, each of the turn portions 52 has, as shown in FIGS. 12A-12B, the crank-shaped part 54 that is bent to offset the adjacent pair of the in-slot portions 51 connected by the turn portion 52 from each other in the direction perpendicular to both the longitudinal direction Y of the electric wire 50 and the extending direction of the in-slot portions 51.

Consequently, with the crank-shaped parts 54 of the turn portions 52, it is possible to arrange each adjacent pair of the turn portions 52 of the electric wires 50 in intimate contact with each other in the finally obtained stator 20, as shown in FIG. 13B. As a result, the radial thickness of the coil end parts 42 of the stator coil 40 can be minimized. In addition, it is also possible to make each adjacent pair of the turn portions 52 of the electric wires 50 extend in the circumferential direction of the stator core 30 without interference therebetween.

In the present embodiment, in the electric wire rolling step 102, during the deformation of each of the turn portions 52 of the planar electric wires 50, the circumferential movement of the crank-shaped part 54 of the turn portion 52 is also restricted by the corresponding restricting portions 94 provided in the rolling apparatus 9.

Consequently, by restricting the circumferential movement of the crank-shaped parts 54 of the turn portions 52, it is possible to more reliably restrict movement of the in-slot portions 51 connected by the turn portions 52; it is also possible to ensure the positional accuracy of the turn portions 52 in the rolled electric wire 50.

Further, in the present embodiment, for each of the turn portions 52 of the electric wires 50, the crank-shaped part 54 is formed substantially at the center of the turn portion 52.

Consequently, it is possible to configure the turn portion 52 to have a symmetrical shape with respect to the crank-shaped part 54.

Furthermore, in the present embodiment, each of the turn portions 52 of the electric wires 50 is stepped, as shown in FIG. 13A, to include the shoulder parts 55 and 56 that extend substantially perpendicular to the in-slot portions 51.

Consequently, in the finally obtained stator 20, the protruding height of each of the turn portions 52 from the corresponding axial end face 30*a* of the stator core 30 will be reduced. As a result, the axial length of the coil end parts 42 of the stator coil 40 and thus the axial length of the entire stator 20 will be accordingly reduced.

In the present embodiment, the inner and intermediate pressing members 91 and 92 of the rolling apparatus 9 can be considered together as a shaping die for shaping each of the planar electric wires 50 into the spiral shape. During the rolling of each of the planar electric wires 50 in the electric wire rolling step 102, each of the turn portions 52 of the electric wire 50 is deformed by pressing the turn portion 52 against the shaping die with the at least one of the in-slot portions 51 of the electric wire 50, which is located closer to the rolling start end of the electric wire 50 than the turn portion 52 is, fixed to the shaping die.

In the present embodiment, the rolling apparatus 9 includes the deforming portions 9121 and 9122 of the inner pressing member 91, the deforming portions 9221 and 9222 of the intermediate pressing member 92, the restricting portions 911L-911G of the inner pressing member 91, and the restricting portions 921F-921A of the intermediate pressing member 92. During the rolling of each of the planar electric wires 50 in the electric wire rolling step 102, the deforming portions 9121, 9222, 9221, and 9222 sequentially deform the turn portions 52 of the planar electric wire 50 from the rolling start end of the electric wire 50, thereby rolling the planar electric wire 50 into the spiral shape. Each of the restricting portions 911L-911G and 921F-921A restricts a corresponding one of the in-slot portions 51L-51A of the planar electric wire 50 during the deformation of the turn portions 52 which are located further from the rolling start end of the electric wire 50 than the corresponding in-slot portion 51 is.

With the above configuration, the rolling apparatus 9 can roll each of the planar electric wires 50 into the spiral shape without lowering the positional accuracy of the in-slot portions 51 and causing the in-slot portions 51 to be twisted.

Further, in the present embodiment, during the rolling of each of the planar electric wires 50 in the electric wire rolling step 102, the first deforming portion 9121 of the inner pressing member 91 and the first deforming portion 9221 of the intermediate pressing member 92 sequentially deform those of the turn portions 52 of the electric wire 50 which are located on one side of the in-slot portions 51; the second deforming portion 9122 of the inner pressing member 91 and the second deforming portion 9222 of the intermediate pressing member 92 sequentially deform those of the turn portions 52 of the electric wire 50 which are located on the other side of the in-slot portions 51. Moreover, each of the restricting portions 911 of the inner pressing member 91 axially extends to connect the first and second deforming portions 9121 and 9122 of the inner pressing member 91; each of the restricting portions 921 of the intermediate pressing member 92 axially extends to connect the first and second deforming portions 9221 and 9222 of the intermediate pressing member 92.

With the above configuration, it is possible to easily fix the relative position between the first deforming portions 9121 and 9221 and the second deforming portions 9122 and 9222. Moreover, it is also possible to reduce the weight of the intermediate pressing member 92, thereby facilitating the operation of placing the intermediate pressing member 92 radially outside the inner pressing member 91 during the rolling of each of the planar electric wires 50 in the electric wire rolling step 102.

While the above particular embodiment of the present invention has been shown and described, it will be understood by those skilled in the art that various modifications, changes, and improvements may be made without departing from the spirit of the invention.

For example, in the previous embodiment, each of the planar electric wires 50 is rolled by more than one turn into the spiral shape as shown in FIGS. 22 and 23. However, each of the planar electric wires 50 may also be rolled by less than one turn into a circular-arc shape as shown in FIG. 32A.

What is claimed is:

1. A method of manufacturing a stator coil for a stator of an electric rotating machine, wherein the stator comprises a hollow cylindrical stator core having a plurality of slots that are formed in a radially inner surface of the stator core and spaced in a circumferential direction of the stator core, the method comprising the steps of:

forming a plurality of substantially planar electric wires, each of the planar electric wires including a plurality of in-slot portions and a plurality of turn portions, each of the in-slot portions being received in a corresponding one of the slots of the stator core, each of the turn portions connecting an adjacent pair of the in-slot portions and being located outside the slots of the stator core;

rolling each of the planar electric wires through plastic deformation into a spiral or circular-arc shape; and assembling the rolled electric wires together to form the stator coil, wherein in the rolling step, each of the planar electric wires is rolled by deforming each of the turn portions of the electric wire while restricting circumferential movement of at least one of the in-slot portions of the electric wire which is located closer to a rolling start end of the electric wire than the turn portion is, for each of the planar electric wires formed in the forming step, each of the turn portions has a crank-shaped part that is bent to offset the adjacent pair of the in-slot portions connected by the turn portion from each other in a direction perpendicular to both a longitudinal direction of the electric wire and an extending direction of the in-slot portions, and in the rolling step, during the deformation of each of the turn portions of the planar electric wires, circumferential movement of the crank-shaped part of the turn portion is also restricted.

2. The method as set forth in claim 1, wherein each of the in-slot portions of the planar electric wires has a substantially rectangular cross section, and in the rolling step, movement of the at least one of the in-slot portions is restricted by fitting the at least one of the in-slot portions into a recess that has a cross section conformed to the substantially rectangular cross section of the in-slot portions.

3. The method as set forth in claim 1, wherein for each of the planar electric wires formed in the forming step, each of the turn portions, which connects an adjacent pair of the in-slot portions, protrudes from the adjacent pair of the in-slot portions in a direction in which the in-slot portions extend.

4. The method as set forth in claim 1, wherein in the rolling step, each of the planar electric wires is rolled by deforming each of the turn portions of the electric wire to extend along a corresponding one of a plurality of arc-shaped surfaces which have different centers of curvature and different radii of curvature.

5. The method as set forth in claim 1, wherein the crank-shaped part is formed substantially at the center of the turn portion.

6. The method as set forth in claim 1, wherein for each of the planar electric wires formed in the forming step, each of the turn portions, which connects an adjacent pair of the in-slot portions, is stepped to include a plurality of shoulder parts that extend substantially perpendicular to the in-slot portions.

7. The method as set forth in claim 1, wherein during the rolling of each of the planar electric wires in the rolling step, each of the turn portions of the electric wire is deformed by pressing the turn portion against a shaping die with the at least one of the in-slot portions fixed to the shaping die.

8. An apparatus for rolling a substantially planar electric wire, which is for use in forming a stator coil of a stator of an electric rotating machine, into a spiral or circular-arc shape, wherein the stator comprises a hollow cylindrical stator core having a plurality of slots that are formed in a radially inner surface of the stator core and spaced in a circumferential direction of the stator core, and the planar electric wire includes a plurality of in-slot portions, each of which is received in a corresponding one of the slots of the stator core, and a plurality of turn portions each of which connects an adjacent pair of the in-slot portions and is located outside the slots of the stator core, the apparatus comprising:

a plurality of deforming portions that sequentially deform the turn portions of the planar electric wire from a rolling start end of the electric wire, thereby rolling the planar electric wire into the spiral or circular-arc shape; and a plurality of restricting portions each of which restricts movement of a corresponding one of the in-slot portions of the planar electric wire during the deformation of the turn portions which are located further from the rolling start end of the electric wire than the corresponding in-slot portion is, wherein each of the restricting portions restricts circumferential movement of the corresponding in-slot portion of the electric wire, each of the turn portions of the electric wire has a crank-shaped part that is bent to offset the adjacent pair of the in-slot portions connected by the turn portion from each other in a direction perpendicular to both a longitudinal direction of the electric wire and an extending direction of the in-slot portions, and the apparatus further comprises a plurality of second restricting portions each of which restricts circumferential movement of a corresponding one of the crank-shaped parts of the turn portions of the electric wire during the deformation of the turn portions which are located further from the rolling start end of the electric wire than the corresponding crank-shaped part is.

9. The apparatus as set forth in claim 8, wherein each of the in-slot portions of the electric wire has a substantially rectangular cross section, each of the restricting portions has formed therein a recess that has a cross section conformed to the substantially rectangular cross section of the in-slot portions of the electric wire, and each of the restricting portions restricts movement of the corresponding in-slot portion of the electric wire by fitting the corresponding in-slot portion into the recess thereof.

10. The apparatus as set forth in claim 8, wherein the deforming portions have respective arc-shaped surfaces which have different centers of curvature and different radii of curvature, and the deforming portions sequentially deform the turn portions of the planar electric wire so that each of the turn portions extends along a corresponding one of the arc-shaped surfaces of the deforming portions.

11. The apparatus as set forth in claim 8, wherein the deforming portions comprise a plurality of first deforming portions and a plurality of second deforming portions, the first deforming portions sequentially deform those of the turn portions of the electric wire which are located on one side of the in-slot portions, and the second deforming portions sequentially deform those of the turn portions of the electric wire which are located on the other side of the in-slot portions.

12. The apparatus as set forth in claim 11; wherein each of the restricting portions connects a corresponding pair of the first and second deforming portions together.

* * * * *